United States Patent [19]

Misawa

[11] Patent Number: 5,347,335
[45] Date of Patent: Sep. 13, 1994

[54] LID LATCH DEVICE IN CAMERA
[75] Inventor: Masayuki Misawa, Tokyo, Japan
[73] Assignee: Asahi Kogaku Kogyo Kabushiki Kaisha, Tokyo, Japan
[21] Appl. No.: 138,435
[22] Filed: Oct. 20, 1993
[30] Foreign Application Priority Data Oct. 28, 1992 [JP] Japan .................. 4-80682[U]

[51] Int. Cl.⁵ ............................................. G03B 17/02
[52] U.S. Cl. ..................................................... 354/288
[58] Field of Search ................ 354/173.1, 173.11, 288

[56] References Cited

U.S. PATENT DOCUMENTS

| | | | |
|---|---|---|---|
| 4,855,772 | 8/1989 | Hashimoto et al. | 354/173.1 |
| 4,887,114 | 12/1989 | Yamamoto et al. | 354/288 |
| 4,913,984 | 4/1990 | Shimizu | 429/97 |
| 4,952,954 | 8/1990 | Kitazawa | 354/173.1 |
| 5,028,944 | 7/1991 | Kobayashi et al. | 354/173.1 |

*Primary Examiner*—Howard B. Blankenship
*Attorney, Agent, or Firm*—Sandler, Greenblum & Bernstein

[57] ABSTRACT

A lid latch device is provided, which is adapted to be used for a back lid openable to a camera. The back lid latch device is provided with a latch member for latching the back lid in a closed position, an open button for releasing the latch member upon movement of the open button from a latched position to a released position, and a detection switch for switching an output signal from a first predetermined level to a second predetermined level. The switch device is actuated directly by the back lid only when the back lid is moved to the closed position and latched by the latch member.

39 Claims, 21 Drawing Sheets

F I G. 7A    F I G. 7B
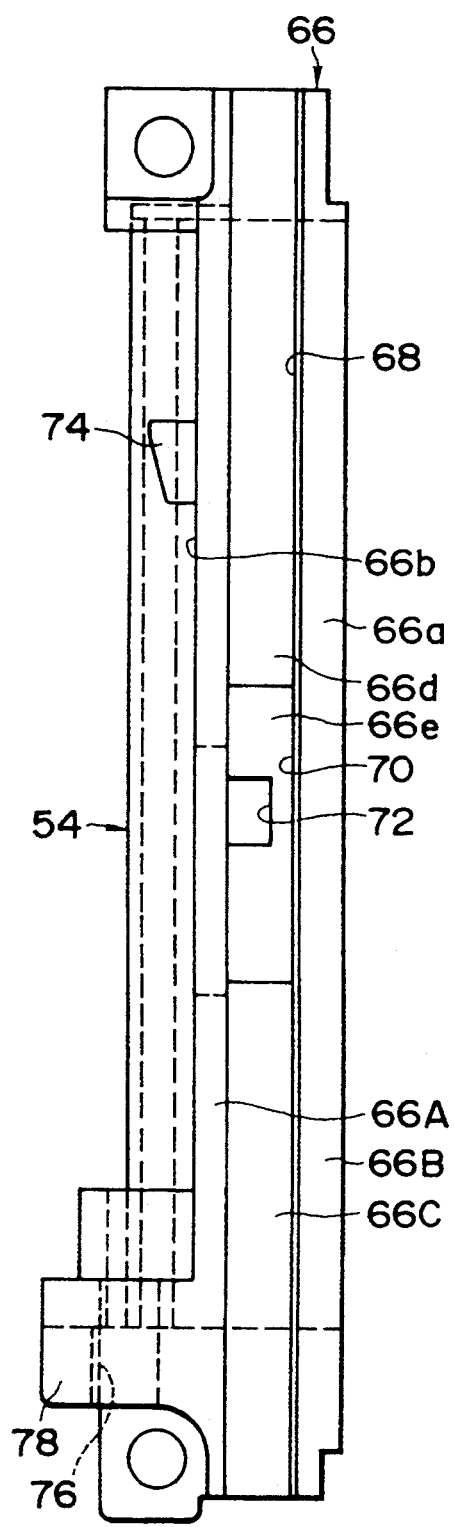
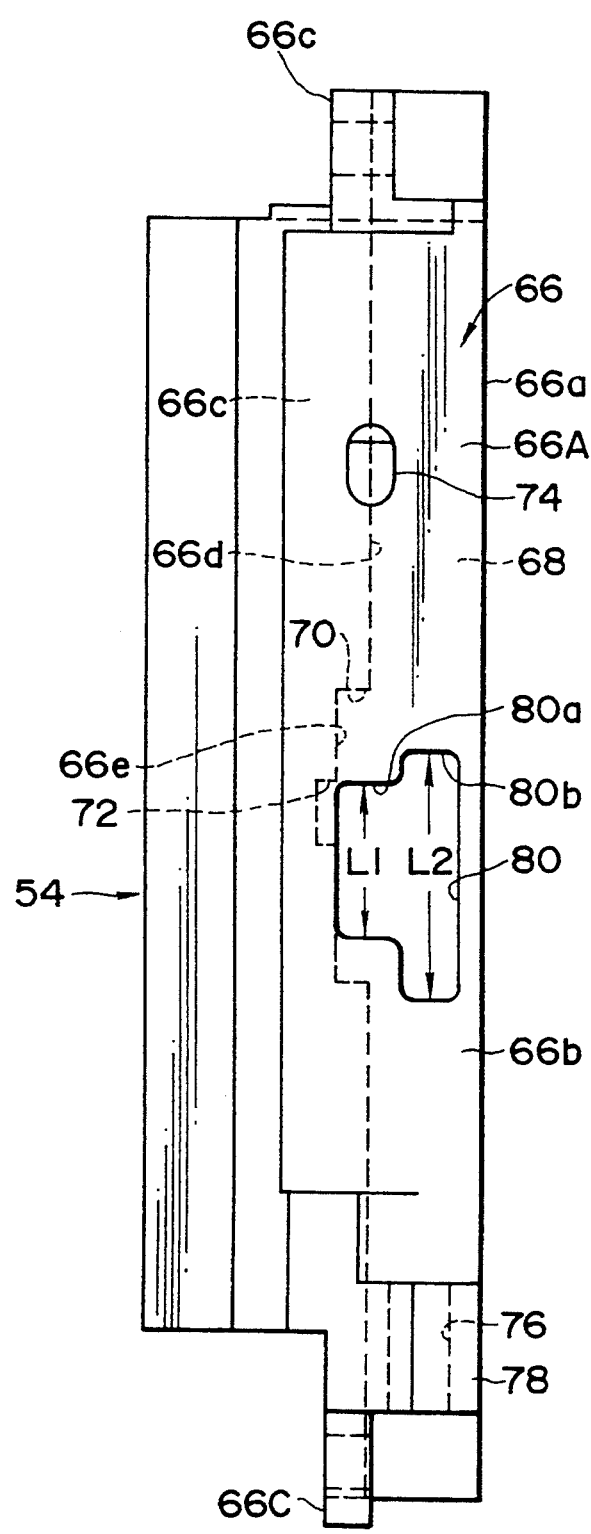

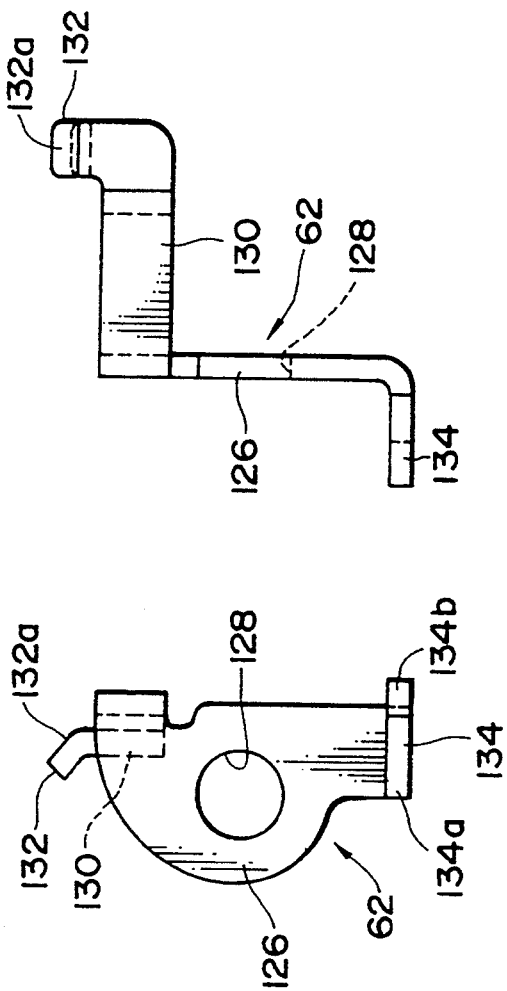
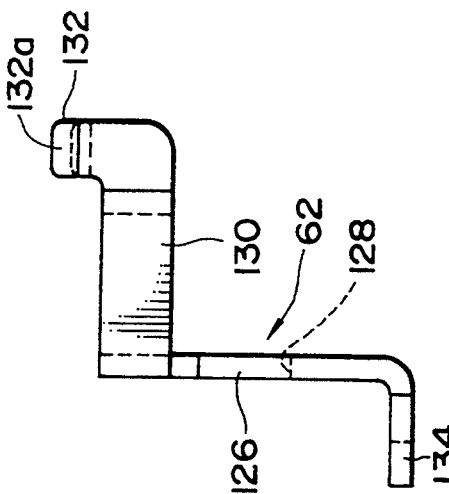
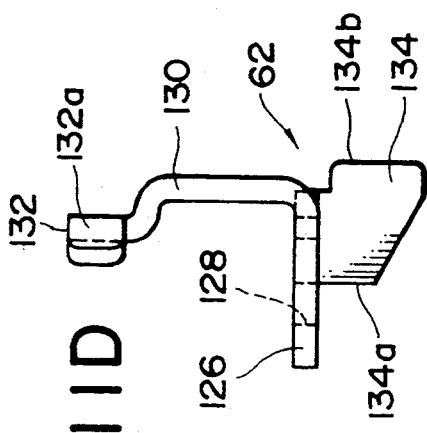
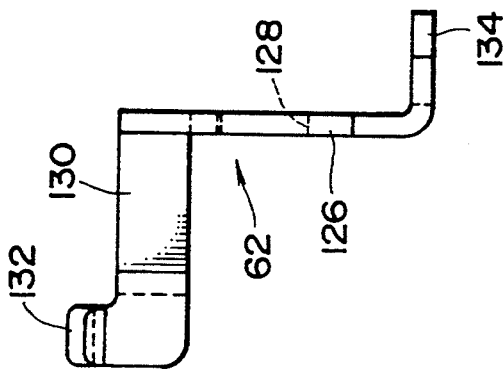

FIG. 14

LID LATCH DEVICE IN CAMERA

BACKGROUND OF THE INVENTION

The present invention relates to a lid latch device adapted to be used for a back lid of a camera, more specifically, it relates to a device for releasably latchlag a back lid of a camera that covers a recessed portion which is formed on the back surface of the camera and provides a film chamber for holding a film cartridge inserted into the camera and a take up spool used to wind the film forward and store the film already exposed.

Conventionally, there is provided a recessed portion for holding a film inserted into a camera, the recessed portion being covered by a back lid which can be swung open. The back lid is attached to a hinged portion at one end and has an engaging portion at the other end. The engaging portion engages another engaging portion that is formed on the side of the recessed portion. When the back lid is closed the two engaging portions are latched together, resulting in the back lid and recessed portion forming a light-tight enclosure.

When an open button which is attached to either the back lid or the recessed portion is slid, the latch is released and the engaging portions of the back lid and the back surface of the camera are disengaged from each other. Accordingly, the back lid is released from the closed position, and the recessed portion can be accessed to load or remove the film.

Recently, there is provided a camera which is equipped with an auto-loading function. In the camera with the auto-loading function, when the open button is first slid, the back lid is released from the closed position, and a film chamber provided in the recessed portion is accessible. Thereafter, a film cartridge from which the leading end portion of the film is drawn out by a predetermined amount is placed in the film chamber and the leading end portion of the film is positioned on a spool shaft. The back lid is then latched closed to cover the recessed portion. When both of the engaging portions are latched together, the film loading operation is automatically initiated. That is, the spool shaft automatically starts rotating, engaging the leading end portion of the film with the spool shaft. The film is automatically wound up around the spool shaft and drawn out from the cartridge until a condition occurs where it is possible to take a photograph is established.

In the conventional camera with the auto-loading function, when the open button is slid to an open position thereby opening the back lid, the open button is held in this open position. When the back lid is latched closed, the open button is released from the open position and returned to the closed position. Further, there is provided a detection device by which the closed position of the open button is detected.

Accordingly in the conventional camera, when the open button is returned to the closed position, this action is detected by the detection device, and the auto-loading operation of the film is started.

However in the conventional camera with the auto-loading function, when an unexpected force or shock is applied to the camera while the back lid is opened during a film loading operation, the open button may be accidentally disengaged from the open position due to the impact force and slide to the closed position. If this happens, the detection device will detect the closed position of the open button even though the back lid is opened and thereby start the auto-loading operation of the film. This will result in the film being wound while the recessed portion is not light-tight, thereby exposing the image recording portion of the film to light, rendering some frames of the image recording portion unusable.

Further the leading edge of the film may be wound before the film cartridge had been properly inserted into the film chamber. This may result in improper winding of the film which could lead to the film being bent or otherwise damaged. This would require corrective action from the photographer, which is both bothersome and time-consuming.

SUMMARY OF THE INVENTION

It is therefore an object of the present invention to provide a lid latch device used in a camera, which can prevent a predetermined operation, which should be initiated when the lid is closed, from being initiated when the lid is opened.

It is another object of the present invention to provide a back lid latch device in a camera, which can prevent the auto-loading operation of the film from starting when the back lid is opened.

It is a further object of the present invention to provide a back lid latch device used in a camera, which can prevent the improper winding of the film from starting even though an unexpected force or shock is applied to the camera before the auto-loading operation is initiated.

It is a still further object of the present invention to provide a back lid latch device used in a camera, which can prevent the improper winding of the film from starting even though an unexpected force or shock is applied to the camera while the back lid is open.

According to one aspect of the present invention, there is provided a lid latch device adapted to be used for a back lid openable to a camera. The device is provided with latch device for latching said back lid in a closed position, and a release device for releasing the latch device. The back lid is unlatched from a closed position when the latch device is released. A switch device is provided for switching an output signal from a first predetermined level to a second predetermined level. The switch device is actuated directly by the back lid only when the back lid is moved to a closed position and latched by the latch device.

According to another aspect of the present invention, there is also provided a lid latch device adapted to be used for a back lid openable to a camera. The device is provided with latch device for latching the lid in a closed position, and a release device for releasing the latch device. The latch device is released when the release device is moved from a resting position to an operating position. An engaging portion is provided which is formed on one of the lid and the latch device. A switch device is provided on the other of the lid and the latch device, for switching a level of an output signal from a first predetermined level to a second predetermined level. The switch device is actuated directly by the back lid only when the back lid is moved to the closed position and latched by the latch device.

According to still another aspect of the present invention, there is provided a lid latch device adapted to be used for a back lid openable to a camera. The device is provided with latch device for latching the lid in a closed position, and a release device for releasing the latch device upon movement of the release device from a resting position to an operating position. An urging device is provided for forcing the release device in the direction of the resting position, during the movement of the release device from a resting position to an operating position. A switch device is provided for switching a level of an output signal from a first predetermined level to a second predetermined level. The switch device is actuated directly by the back lid only when the back lid is moved to a closed position and latched by the latch device.

According to a different aspect of the present invention, there is provided a detection mechanism for detecting a closing of a back lid of a camera. The camera includes latch device for latching the back lid in a closed position, and a release device for releasing the latch device. The back lid is unlatched from a closed position when the latch device is released. The mechanism includes an engaging portion provided to the back lid. The latch device includes a hook portion for engaging the engaging portion thereby latching the back lid in the closed position. A switch device is provided for switching an output signal from a first predetermined level to a second predetermined level. The switch device is actuated directly by the engaging member of the back lid only when the back lid is moved to a closed position and latched by the latch device.

The above and other objects, features and advantages of the present invention will become apparent from the following detailed description in conjunction with the accompanying drawing.

DESCRIPTION OF THE ACCOMPANYING DRAWINGS

FIGS. 7A through 7D are front, left, plan and bottom views respectively, of a holder member provided in the lid latch device;

FIGS. 11A through 11D are front, left, right and rear views respectively, of a pressure lever provided in the lid latch device;

FIG. 14 is a vertical cross-sectional view of the lid latch device corresponding to the B—B cross section of FIG. 4 in a condition where the back lid is further closed from the state shown in FIG. 13 and the slant engaging surface of the back lid urges the slant surface of the hook portion downward thereby lowering the latch member;

FIG. 15;

Figure 4:
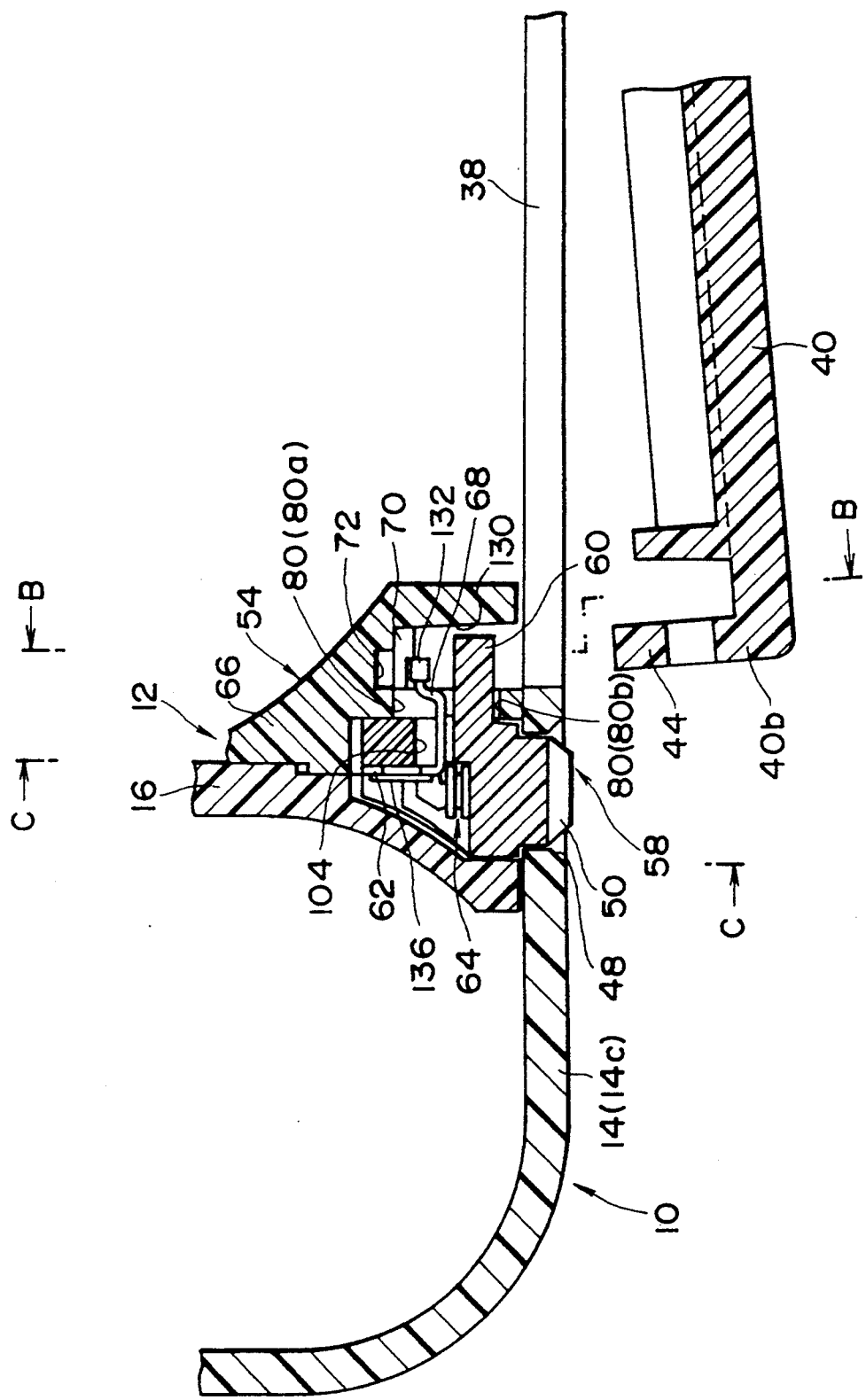
FIG. 4 is a horizontal sectional view of the lid latch device corresponding to the A—A cross-section of FIG. 3, in the condition where the back lid is in an open state.
Figure 18:
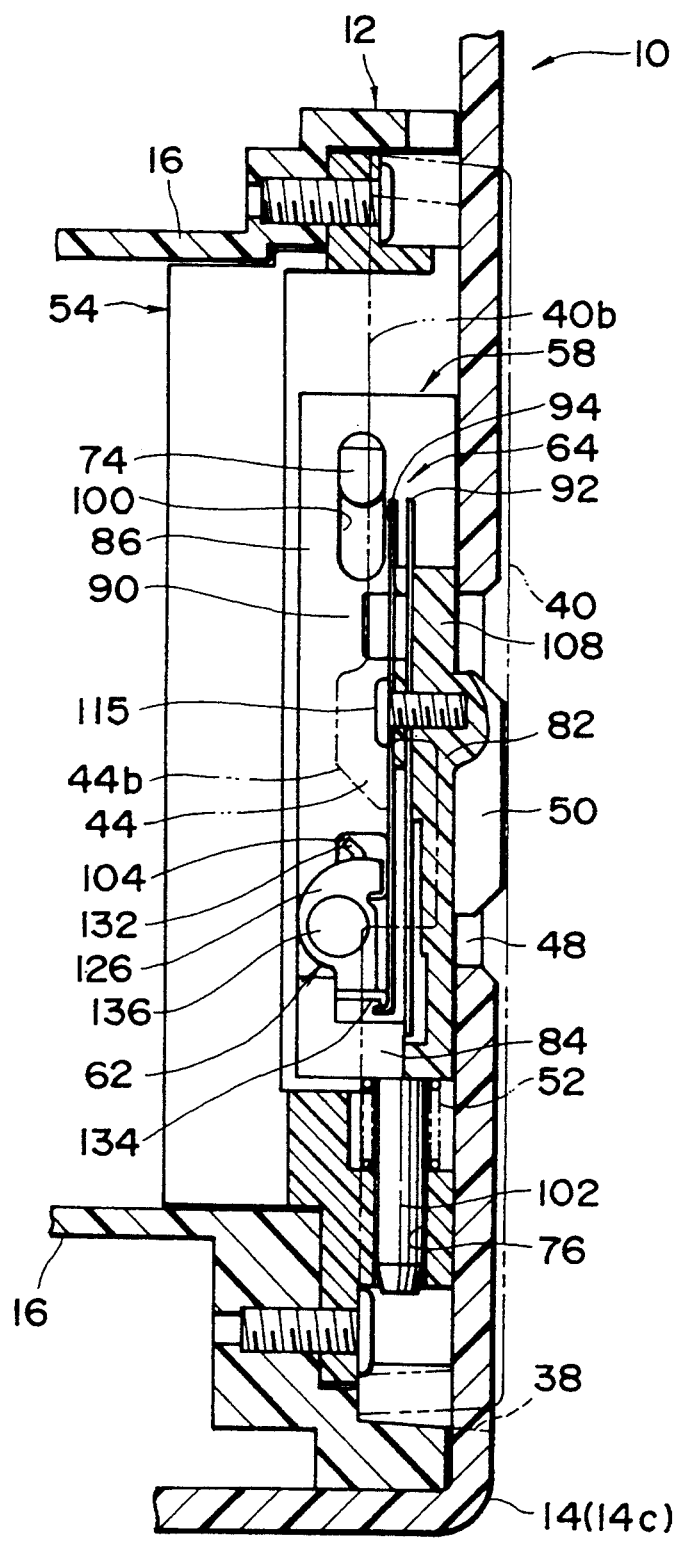
Figure 19:
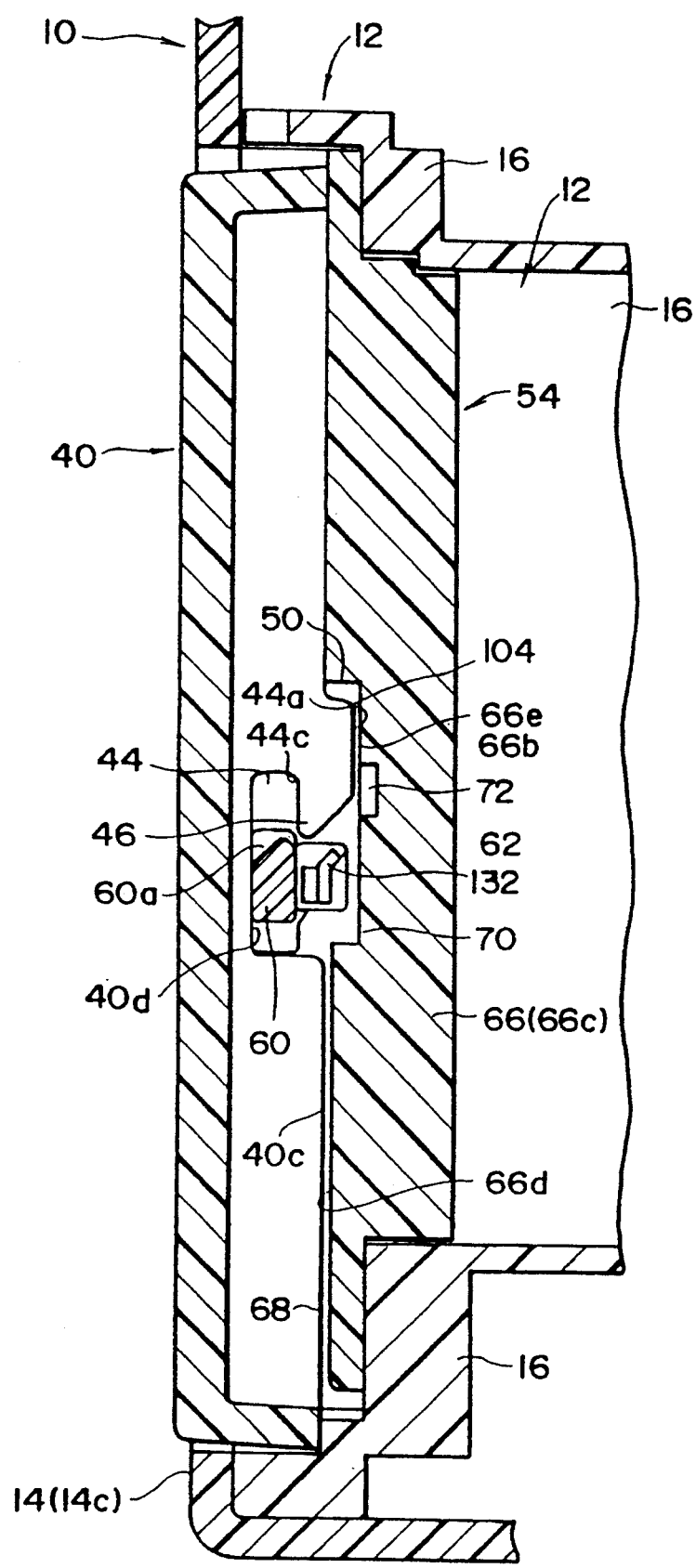

FIG. 18 is a vertical cross-sectional view of the lid latch device corresponding to the C—C cross-section of FIG. 4, in a condition where the back lid is in the closed state but the open button is depressed to its operating position thereby releasing the latch of the back lid; and FIG. 19 is a vertical cross-sectional view of the lid latch device corresponding to the B—B cross-section of FIG. 4, in the same condition shown in FIG. 8.

DESCRIPTION OF THE EMBODIMENT

A lid latch device as one embodiment of a lid latch device adapted to be used for a back lid of a camera of the present invention will now be described in detail with reference to the accompanying drawings.

Figure 1:
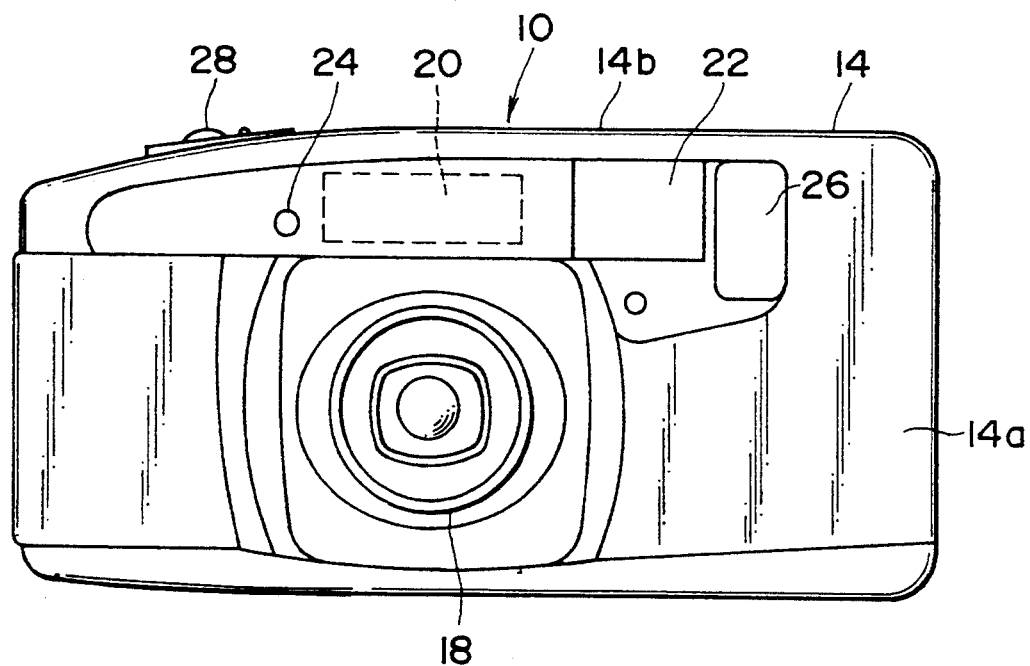
FIG. 1 is a front view of the camera in which a lid latch device representing one embodiment according to the present invention, is provided.
Figure 2:
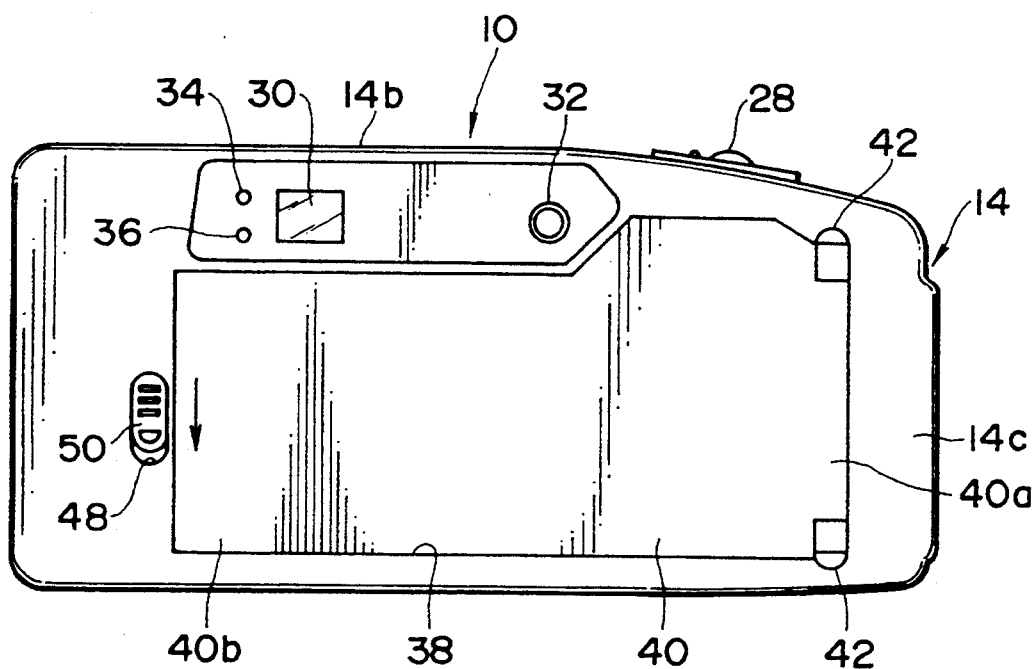
FIG. 2 is a rear view of the camera shown in FIG. 1.

As shown in FIGS. 1 and 2, a camera 10 with which the lid latch device 12 (described in detail later) is equipped includes a camera housing 14 and a main frame 16 (shown in FIG. 4). The camera housing 14 has a front surface 14a, an upper surface 14b and a back surface 14c. A lens barrel 18 protrudes from the central portion of the front surface 14a of the camera housing 14. The front surface 14a of the camera housing 14 also has an auto-flash unit 20 positioned above the lens barrel 18, a front finder window 22 located on the right side of the auto-flash unit 20, a light-measuring element 24 on the left side of the auto-flash unit 20, and a flash element 26 on the right side of the front finder window 22.

The upper surface 14b of the camera housing 14 has a release button 28 disposed thereon. A rear finder window 30 is located on the back surface 14c of the camera housing 14 behind the front finder window 22. The back surface 14c of the camera housing 14 also has a main switch 32 positioned to the right of the rear finder window 30, an AF state indicator 34 to the left and upper side of the rear finder window 30 and a flash state indicator 36 to the left and lower side of the rear finder window 30.

As shown in FIG. 2, a recessed portion 38 is formed in the back surface 14c of the camera housing 14 for holding a film (not shown) in the camera 10. The recessed portion 38 is covered by a back lid 40 which can be swung open. Therefore, the back lid 40 is swingable between an open position for accessing the recessed portion 38 and a closed position for covering the recessed portion 38.

Figure 3:
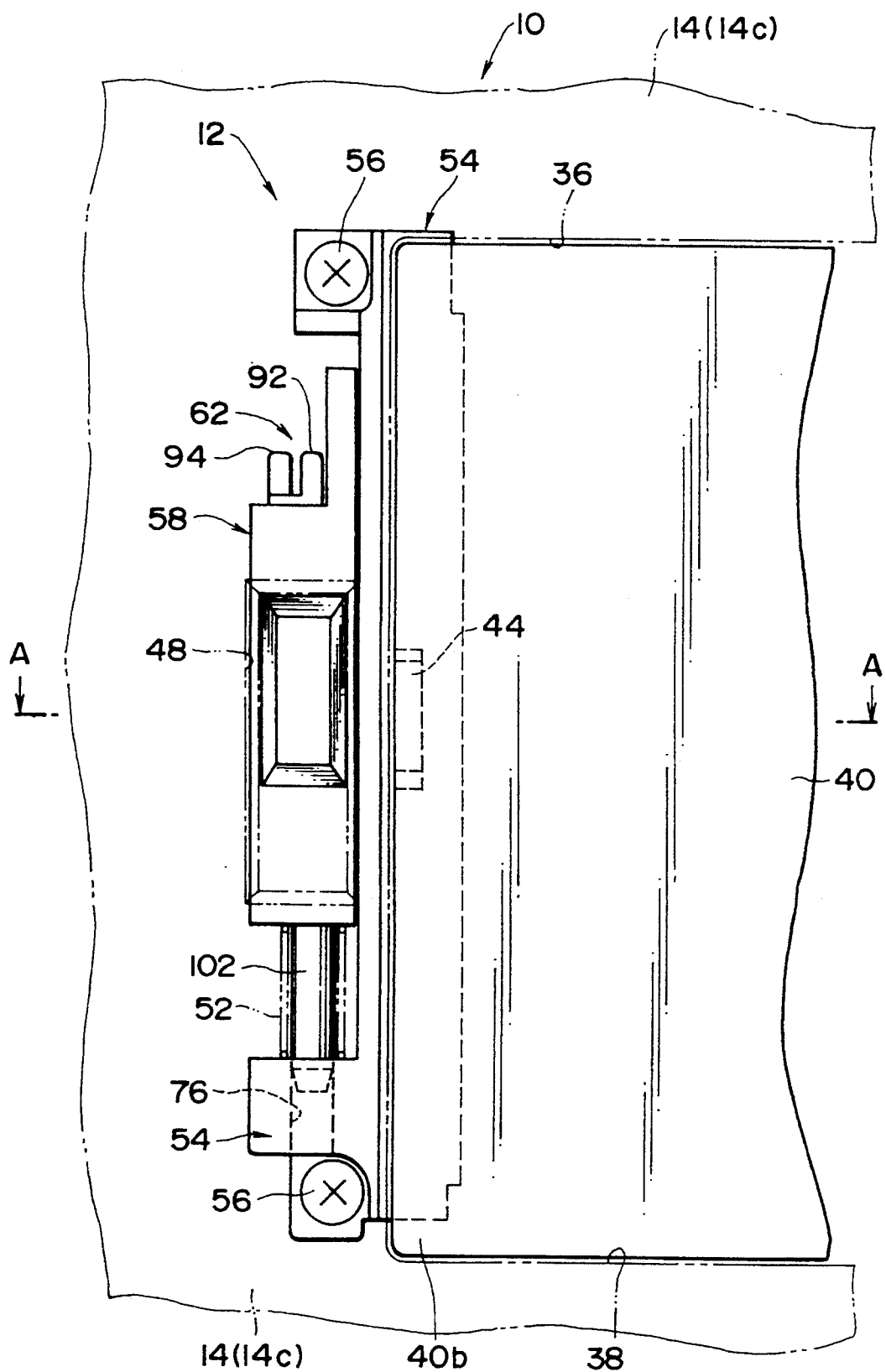
FIG. 3 is an enlarged front view of the lid latch device, in a condition where the back lid is latched by the lid latch device, i.e., the back lid is in an closed state and an open button is not depressed from its resting position.

The back lid 40 is attached to one side edge of the recessed portion 38 at the side edge 40a (i.e., the right side edge in FIG. 2) thereof by means of hinges 42. As shown in FIG. 3, the back lid 40 is integrally formed with an engaging portion 44 protruding from another side edge 40b (i.e., the left side edge in FIG. 2). The engaging portion 44 is engaged or latched by a hook portion 60 of the lid latch device 12 to be described in detail later.

Figure 5:
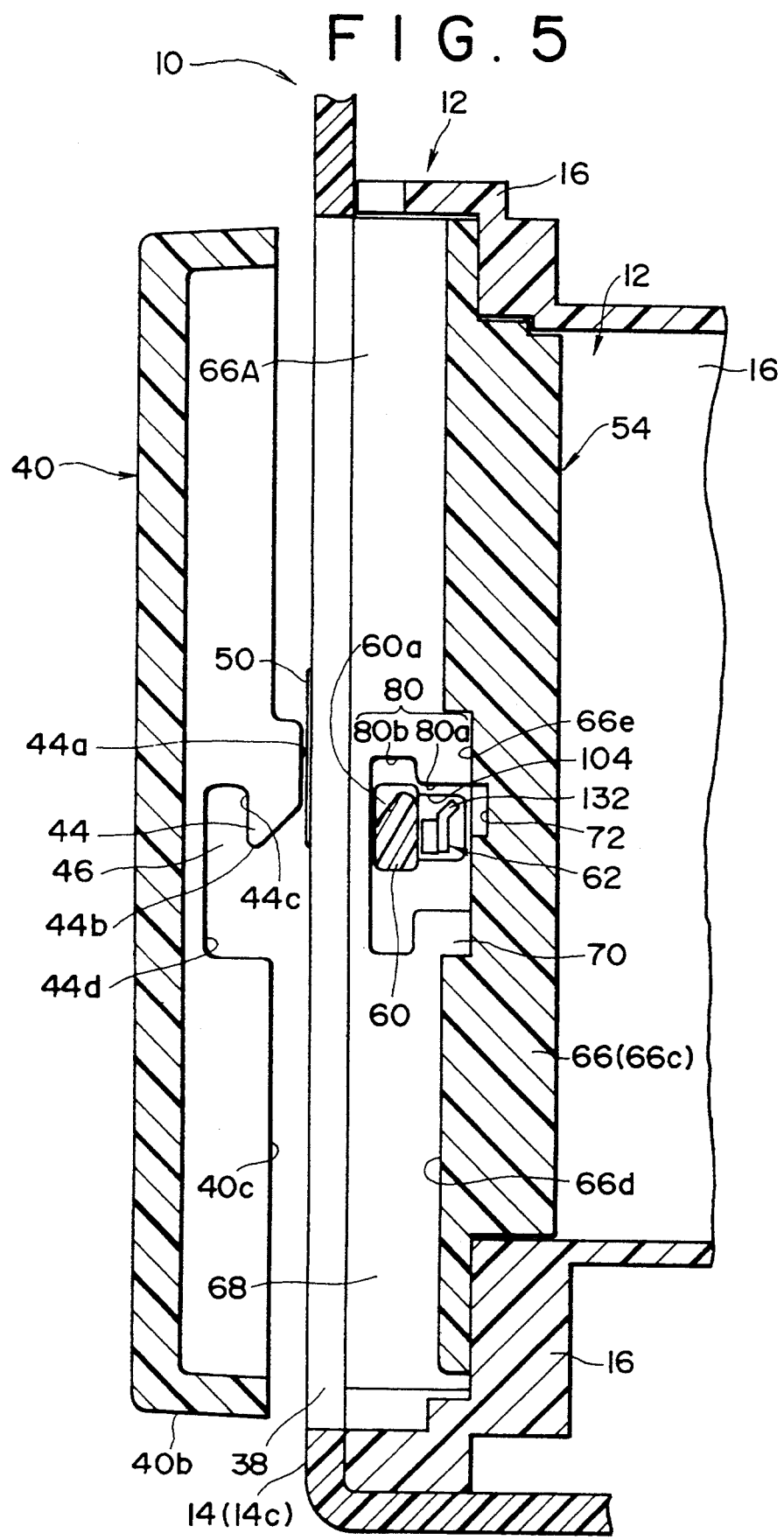
FIG. 5 is a vertical sectional view of the lid latch device corresponding to the B—B cross-section of FIG. 4, in the same condition as shown in FIG. 4.

As shown in FIG. 4, the engaging portion 44 is formed such that it extends in a vertical plane perpendicular to the extending plane of the back lid 40. As shown in FIG. 5, the engaging portion 44 has a front vertical surface 44a protruding from the edge portion 40c of the side edge 40b, a slant surface or engaging surface 44b formed on the lower portion of the vertical surface 44a, and a rear vertical surface 44c retracted from the edge portion 40c of the side edge 40b. Accordingly, there is provided a groove 46 between the rear vertical surface 44c and an edge portion 40d of the other side edge 40b. The hook portion 60 is set to be inserted into the groove 46 thereby engaging or latching the engaging portion 44 of the back lid 40.

As shown in FIG. 3, the lid latch device 12 is provided next to an outer edge of the recessed portion 38 over the entire height of the recessed portion 38. The lid latch device 12 is provided for releasably latching the engaging portion 44 of the back lid 40 when the back lid 40 is closed, resulting in the back lid 40 and the recessed portion 38 forming a light-tight enclosure.

The lid latch device 12 includes an elongated opening 48 which is formed on the back surface 14c of the camera housing 14 near the outer edge of the recessed portion 38. The elongated opening 48 extends in the vertical direction, and penetrates the camera housing 14 in the thickness direction thereof. The lid latch device 12 further includes an open button 50 which is slidably received in the elongated opening 48 so as to be movable between an upper latch position and a lower release position. The open button 50 is biased to the upper latch position by a spring 52, described later.

When the open button 50 is slid downward or depressed from the upper latch position to the lower release position in the elongated opening 48, against the urging force of the spring 52, the lid latch device 12 is unlatched. Thus the engaging portion 44 of the back lid 40 is disengaged from the back surface 14c of the camera housing 14. Accordingly, the back lid 40 is released from the closed position and swung open, and thus, the recessed portion 38 can be accessed to load or remove the film cartridge (not shown).

Hereinafter, the detailed construction of the lid latch device 12 will be described with reference to FIGS. 3 to 12.

Figure 6:
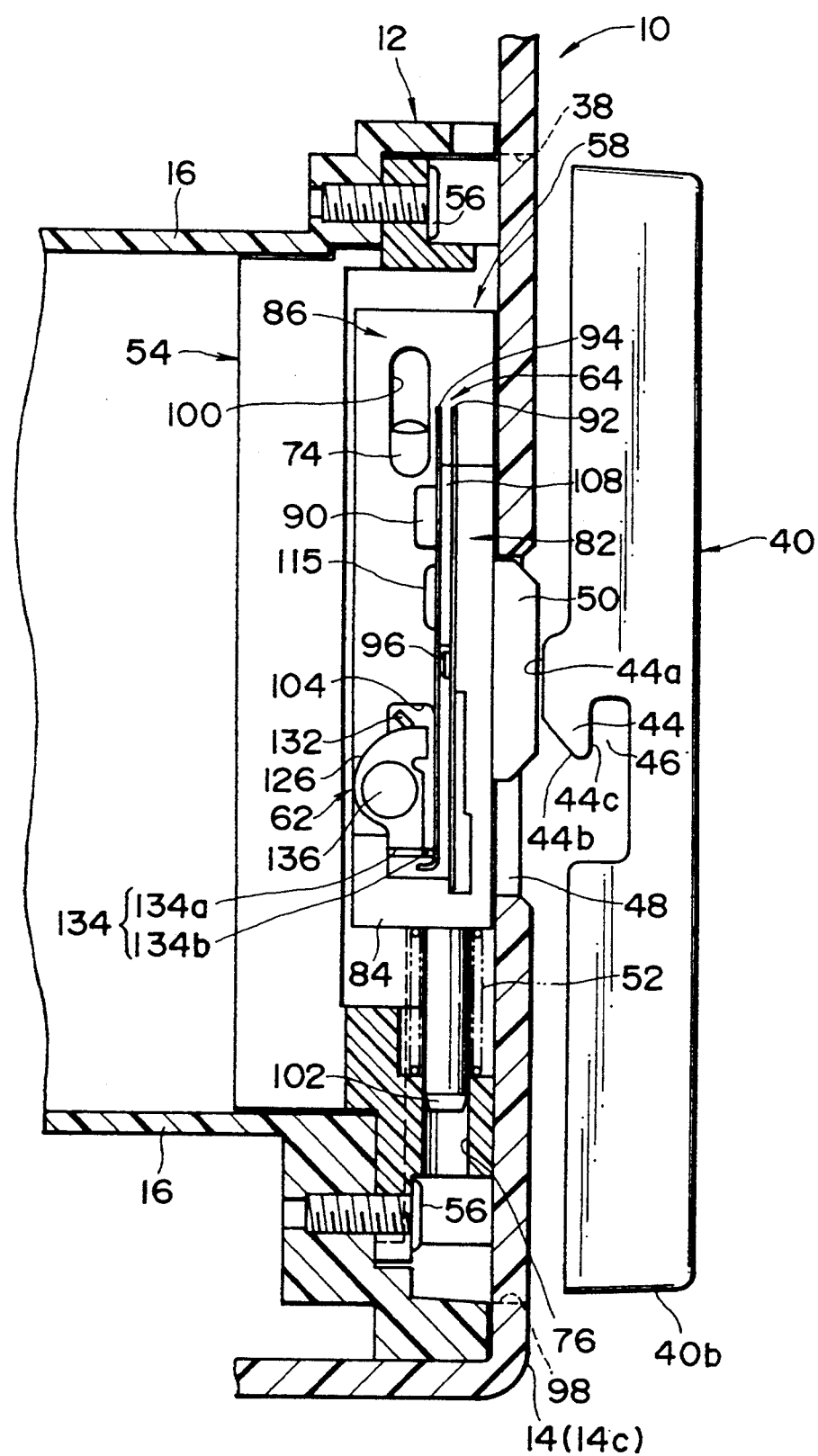
FIG. 6 is a vertical sectional view of the lid latch device corresponding to the C—C cross-section of FIG. 4, in the same condition as shown in FIG. 4.

As shown in FIGS. 4 through 6, the lid latch device 12 includes a holder member 54 which is fixed to the rear portion of the main frame 16 through a pair of screws 56 on the upper and lower ends thereof, and a latch member 58 which is vertically slidably mounted to the holder member 54. The front surface of the latch member 58 has the open button 50 integrally formed thereon. The side surface of the latch member 58 has the hook portion 60 which is capable of being engaged with the engaging portion 44 of the back lid 40 thereby latching the back lid 40, integrally formed thereon. The lid latch device 12 further includes a pressure lever 62 which is swingably attached to the latch member 58 and is normally held in an upright position. The pressure lever 62 is swung from the upright position to a slanted position by the engaging portion 44 of the back lid 40 when the engaging portion 44 is engaged with the hook portion 60 of the latch member 58. The lid latch device 12 also includes a detection switch 64 which is attached to the latch member 58 and capable of being actuated by the pressure lever 62 which is swung from the upright position to the slanted position. The latch member 58 is biased upward by the urging force of the spring 52.

The detection switch 64 is normally turned OFF in the condition where the pressure lever 62 is held in the upright position, while it would be turned ON by the pressure lever 62 when it is swung to the slanted position, which corresponds to the back lid 40 being closed and latched by the lid latch device 12.

Figure 7C:
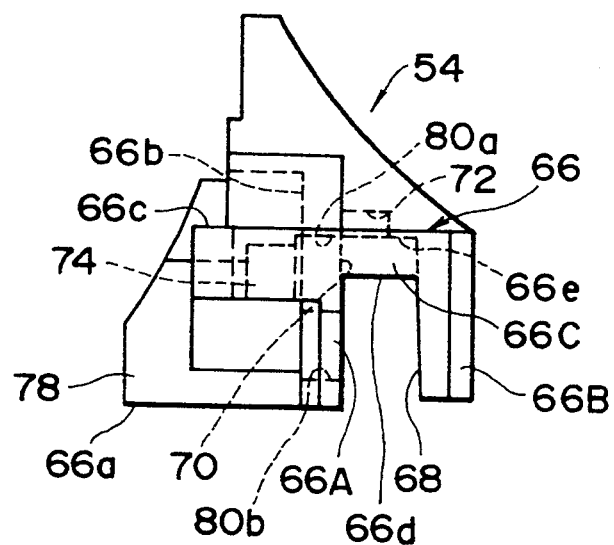
Figure 7D:
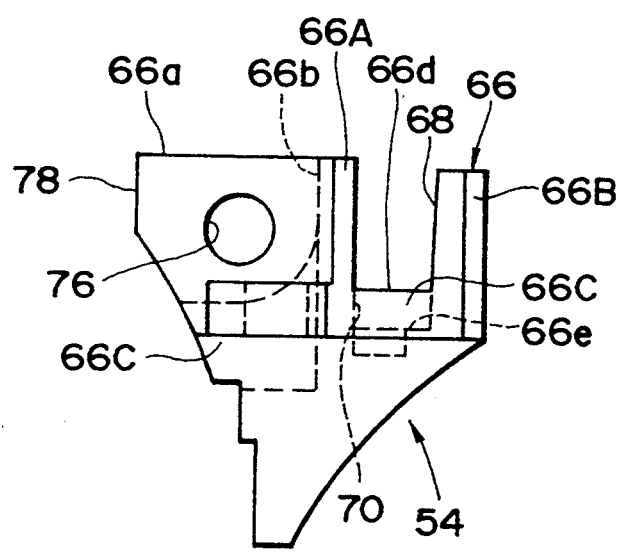
Figure 8B:
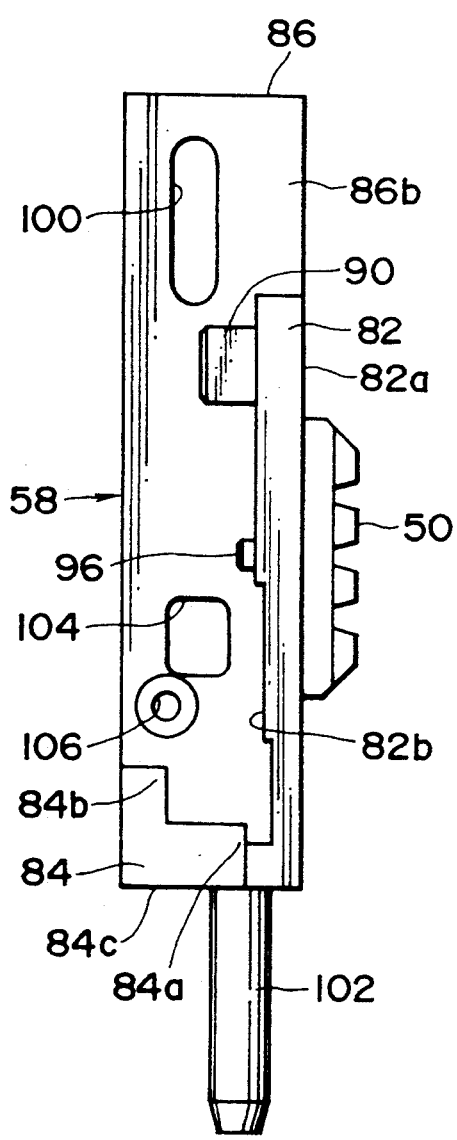
FIGS. 8A through 8F are front, left, plan, bottom, right and rear views respectively, of a latch member provided in the lid latch device.
Figure 8A:
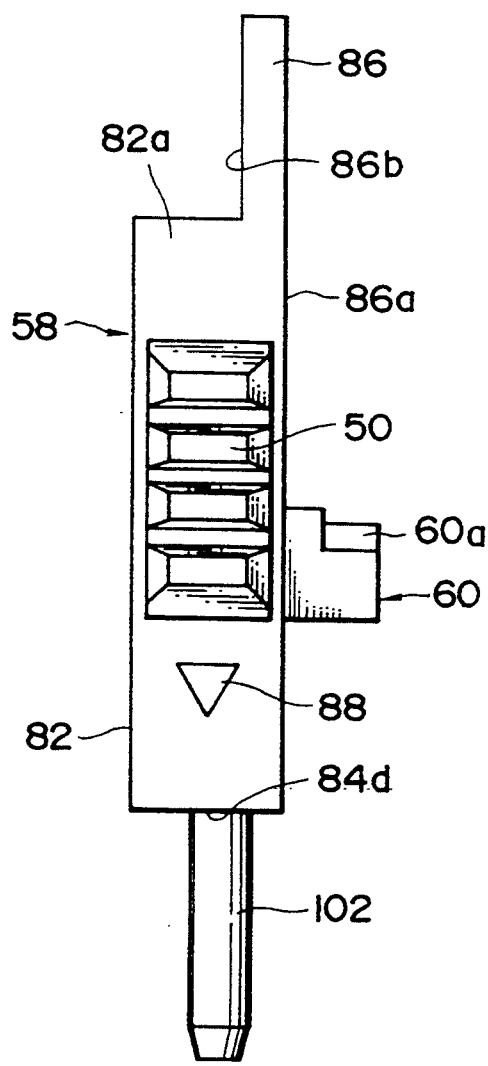
Figure 8C:
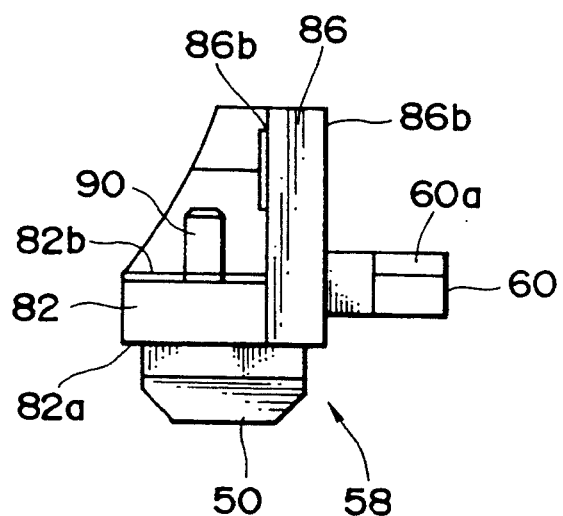
Figure 8D:
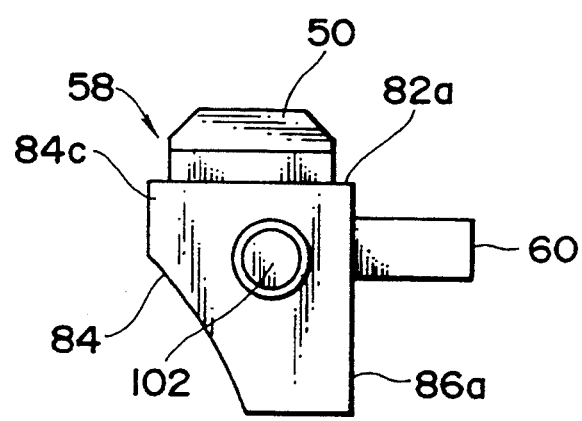
Figure 8E:
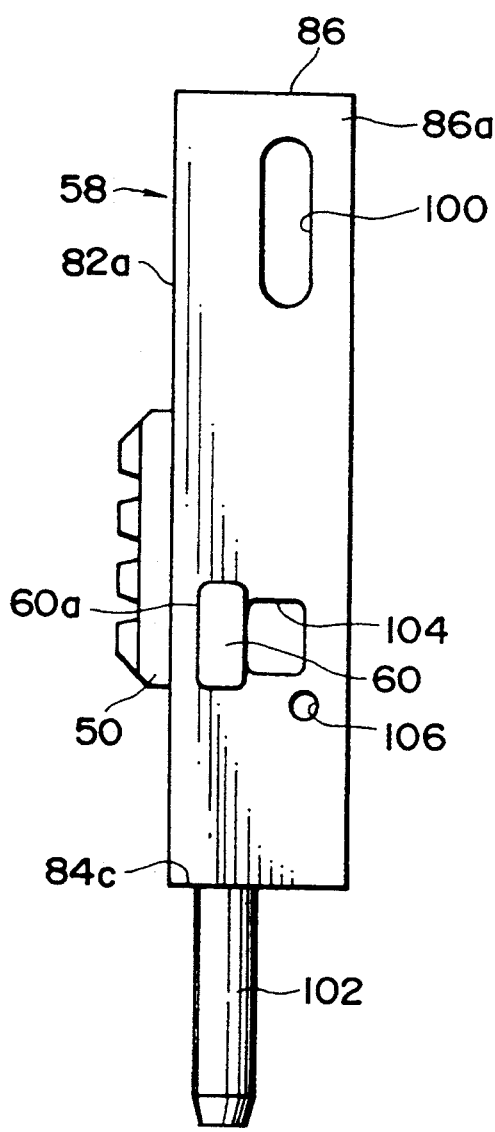
Figure 8F:
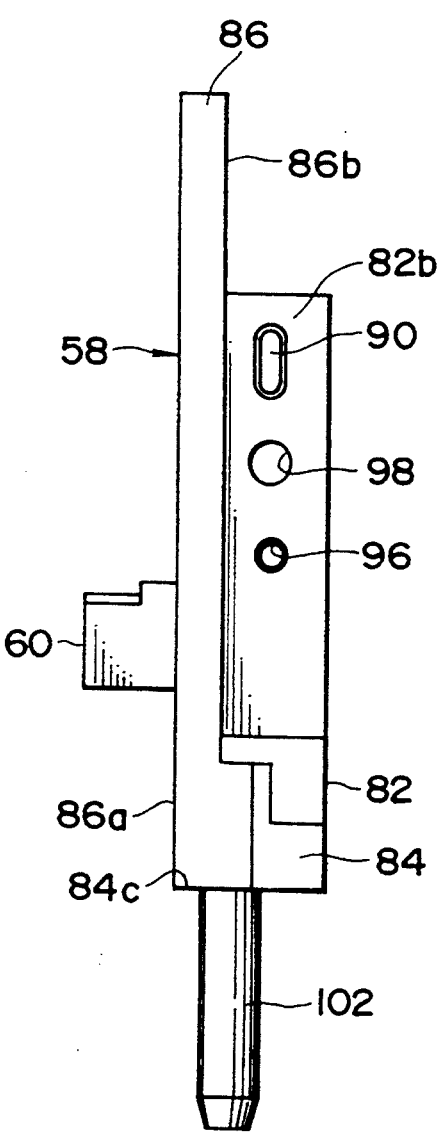

As shown in FIGS. 7A through 7D, the holder member 54 includes a holder main body 66 extending vertically which has a front surface 66a, a left side surface 66b and a back surface 66c which is attached to the front surface of the main frame 16. A groove 68, which extends vertically is formed on the front surface 66a of the holder main body 66, is a groove 68 which extends vertically. The side edge 40b of the back lid 40 fits into the groove 68. By forming the groove 68, the holder main body 66 is shaped to have a left portion 66A, a right portion 66B and a bottom portion 66C as shown in FIG. 7A.

On a bottom surface 66d of the bottom portion 66C, a large recess 70 is formed for receiving the engaging portion 44 of the back lid 40 which has been latched by the lid latch device 12. On a bottom surface portion 66e of the large recess 70, a small recess 72 is formed for receiving a slant portion 132 of the pressure lever 62 (mentioned in detail later) which has been pressed by the engaging portion 44 of the back lid 40 when the back lid 40 is closed, and when the open button 50 is held in the upper latch position.

A guide boss 74 is integrally formed on the left side surface 66b of the holder main body 66 so as to extend vertically. A guide hole 76 is formed in a boss portion 78 integrally formed to the left side surface 66b of the holder main body 66 so as to vertically penetrate the boss portion 78. The guide boss 74 and the guide hole 76 are provided for guiding the vertical slide path of the latch member 58.

As shown in FIG. 7B, a through hole 80 is formed in the left portion 66A of the holder main body 66, so as to penetrate the left portion 66a in the thickness direction thereof. That is, the through hole 80 is opened to the groove 68. The through hole 80 is arranged adjacent to the large and small recesses 70 and 72. The through hole 80 includes a small hole portion 80a, the left side edge of which is aligned with the bottom surface 66e of the large recess 70, and having a height L1 in the vertical direction. The through hole 80 further includes a large hole portion 80b disposed on the right side of the small hole portion 80a, having a height L2 which is longer than height L1 of the small hole portion 80a.

The height L1 of the small hole portion 80a is set to be long enough to allow the vertical movement of an arm portion 130 (described later) of the pressure lever 62, when the latch member 58 is moved between the upper latch position and the lower release position. The height L2 of the large hole portion 80b is set to be long enough to allow the vertical movement of the hook portion 60 of the latch member 58, when the latch member 58 is moved between the upper latched position and the lower released position.

As shown in FIGS. 8A through 8F, the latch member 58 includes a main plate 82 extending vertically, having a front surface 82a on which the open button 50 is integrally formed, and a back surface 82b. A bottom plate 84 is integrally formed to the lower end of the main plate 82. A side plate 86 extending vertically and which is integrally formed to the main plate 82, is bent at a right angle and has a right side surface 86a which is set to be in sliding contact with the left side surface of the holder main body 66 of the holder member 54, and a left side surface 86b.

The bottom plate 84 has a first stepped portion 84a which engages a lower end portion of a stationary terminal plate 92 (described later), included in the detection switch 64, and a second stepped portion 84b which engages a rear end 134a of a contact plate 134 (mentioned later) of the pressure lever 62.

An indication 88 is indented on the front surface 82a of the main plate 82, for indicating the depressing direction of the open button 50 toward the lower release position. The indication 88 is a reversed triangular shape. On the back surface 82b of the main plate 82, a first positioning boss portion 90 protrudes the upper side and is used to position both a stationary terminal plate 92 and a movable terminal plate 94 of the detection switch 62. A second positioning boss portion 96 protrudes the lower side and is used to position the stationary terminal plate 92. Also on the back surface 82b of the main plate 82, a threaded hole 98, with which a screw 115 is to be engaged, is formed between the first and second boss portions 90 and 96.

An elongated guide hole 100, in which the guide boss 74 of the holder member 54 is to be slidably received, is formed in the upper portion of the side plate 86. The elongated guide hole 100 extends vertically and is formed to penetrate the side plate 86. A guide rod 102, which is to be slidably inserted into the guide hole 78 of the holder member 54, is formed on the bottom surface 84c of the bottom plate 84 so as to extend downwardly. Thus, the latch member 58 is slidably supported in the holder member 54.

A through hole 104 is formed in the middle portion of the side plate 86 to penetrate the side plate 86 in the thickness direction thereof. Through the hole 104, a part of the pressure lever 62 protrudes into the large recess 70 through the small hole portion 80a of the through hole 80 of the holder member 54. A support hole 106 is formed on the left surface 86b of the side plate 86 below the through hole 104, for rotatably supporting the pressure lever 62.

The hook portion 60 is integrally formed on the right surface 86a of the side plate 86 of the latch member 58. The hook portion 60 is set to be adjacent to the opening of the through hole 104, and the hook portion 60 has a slanted surface 60a on the top portion thereof. The hook portion 60 protrudes into the groove 68 through the large hole portion 80b of the through hole 80 of the holder member 54.

As shown in FIG. 6, the detection switch 64 includes the stationary terminal plate 92 which is directly fixed to the back surface 58a of the latch member 58 and which is formed of an electrically conductive material. The detection switch 64 further includes the movable terminal plate 94 which has one end fixed to the back surface 58a of the latch member 58 above the stationary terminal plate 92 and which is formed of an electrically conductive and flexible material, and a spacer 108, formed of an electrically insulating material, which is provided between the stationary plate 92 and the movable plate 94 to separate them from each other.

Figure 9A:
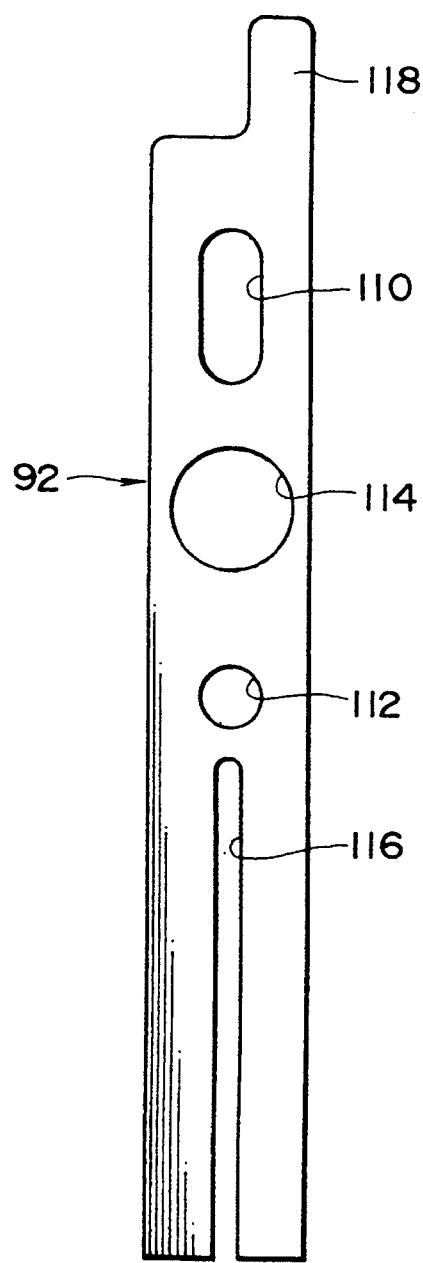
FIGS. 9A and 9B are front and side views respectively, of a stationary terminal plate used in a back lid detecting switch.
Figure 9B:
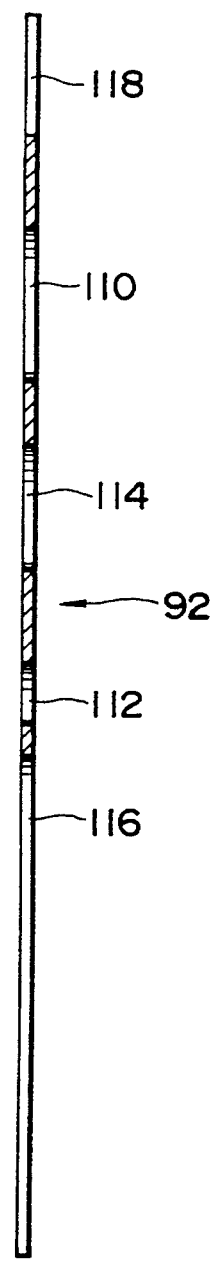

As shown in FIGS. 9A and 9B, the stationary terminal plate 92 has a first positioning hole 110 which is formed on the upper side portion thereof to penetrate the stationary terminal plate 92 in the thickness direction thereof. The first positioning boss portion 90 of the latch member 58 is inserted through the first positioning hole 110. The stationary terminal plate 92 also has a second positioning hole 112 which is formed on the lower side portion thereof to penetrate the stationary terminal plate 92 in the thickness direction thereof. The second positioning boss portion 96 of the latch member 58 is inserted through the second positioning hole 112. The stationary terminal plate 92 also has a hole 114 through which a screw 115 is inserted, and which is formed between the first and second positioning holes 110 and 112 to penetrate the stationary terminal plate 92 in the thickness direction thereof.

The stationary terminal plate 92 has a slit 116 which is formed on the lower end thereof and extends vertically from the bottom surface to the middle thereof. A terminal end 118 is integrally formed on the upper end of the stationary terminal plate 92. The terminal end 118 is electrically connected to a detection circuit (not shown) for detecting whether or not the back lid 40 is closed and latched by the lid latch device 12. The detection circuit is constructed so that it initiates the winding operation of the film from the film cartridge, when it detects the change of the output level of the detection switch 64 from the OFF state to the ON state.

Figure 10A:
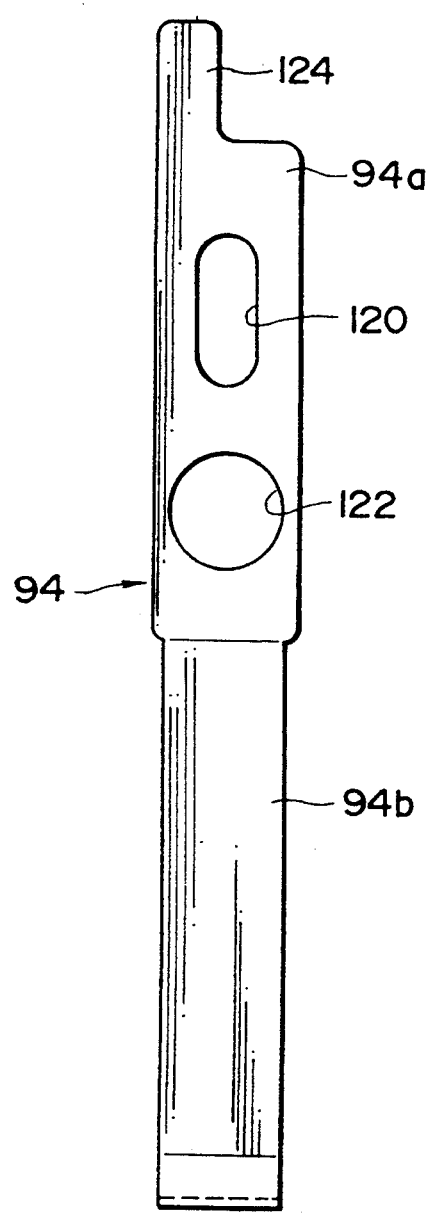
FIGS. 10A and 10B are front and side views respectively, of a movable terminal plate used in the back lid detecting switch.
Figure 10B:
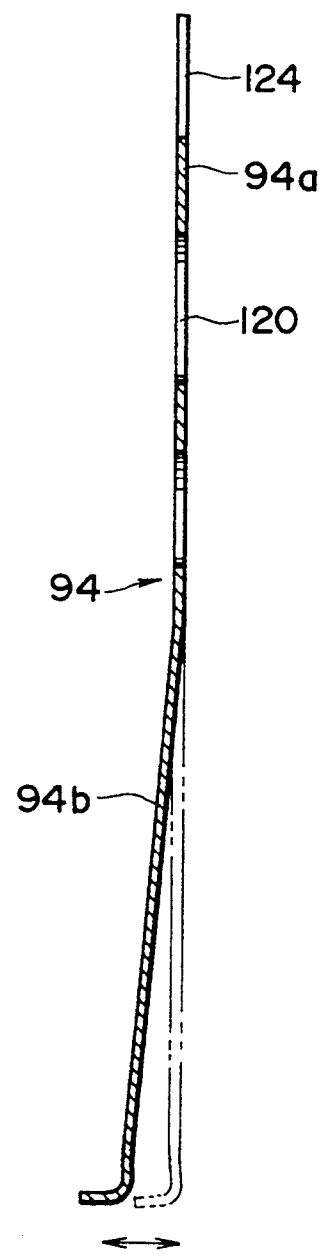

As shown in FIG. 10A and 10B, the movable terminal plate 94 has a first positioning hole 120 which is formed on the upper side of an upper half portion 94a thereof to penetrate the movable terminal plate 94 in the thickness direction thereof. The first positioning boss portion 90 of the latch member 58 is inserted through the first positioning hole 120 after insertion through the first positioning hole 110 of the stationary terminal plate 92. The movable terminal plate 94 also has a hole 122 through which the screw 115 is inserted, and which is formed below the first positioning holes 120 on the upper half portion 94a of the movable terminal plate 94. The screw 115 is inserted through the holes 114 and 122 thereby being fixed in the threaded hole 92 of the latch member 58.

A terminal end 124 is integrally formed on the upper end of the movable terminal plate 94. The terminal end 124 is electrically connected to the detection circuit. The terminal end 118 of the stationary terminal plate 92 is also connected to the detection circuit, but at a different terminal than the terminal 124 of the plate 94.

As shown in FIG. 10B, a lower half portion 94b of the movable terminal plate 94 is bent away from the upper half portion 94a in such a fashion that it slants away from the upper half portion 94a by a small predetermined angle. Due to the elasticity of the movable terminal plate 94, if the lower end of the lower half portion 94a of the movable terminal plate 94 is pushed to the right in FIG. 10B, it will tend to return to its resting position (indicated by a solid line in FIG. 10B) as a result of the resiliency of the material therein.

In the detection switch 64, the ON state occurs if the movable terminal plate 94 and the stationary terminal plate 92 are electrically isolated from each other (i.e., not in contact with each other). The OFF state occurs if the movable terminal plate 94 and the stationary terminal plate 92 are electrically connected with each other (i.e., in contact with each other).

As shown in FIGS. 11A through 11D, the pressure member 62 includes a main plate 126 which is formed into a substantially semicircular shape in which the chord thereof is set to extend upright, a through hole 128 formed in the substantially central portion of the main plate 126, and an arm portion 130 which is bent from the upper end of the main plate 126 to extend perpendicular and vertically to the main plate 126 as shown in FIGS. 11A and 11B. Pressure member 62 further includes a slant portion 132 integrally formed on the distal end of the arm portion 130 having a slant surface 132a thereon in such a manner that the upper edge is remote from the lower edge thereof relative to the front surface 82a of the main plate 82 of the latch member 58, and a contact plate 134, which is bent from the bottom end of the main plate 126 to extend perpendicular and horizontally to the main plate 126 as shown in FIG. 11A.

Figure 12:
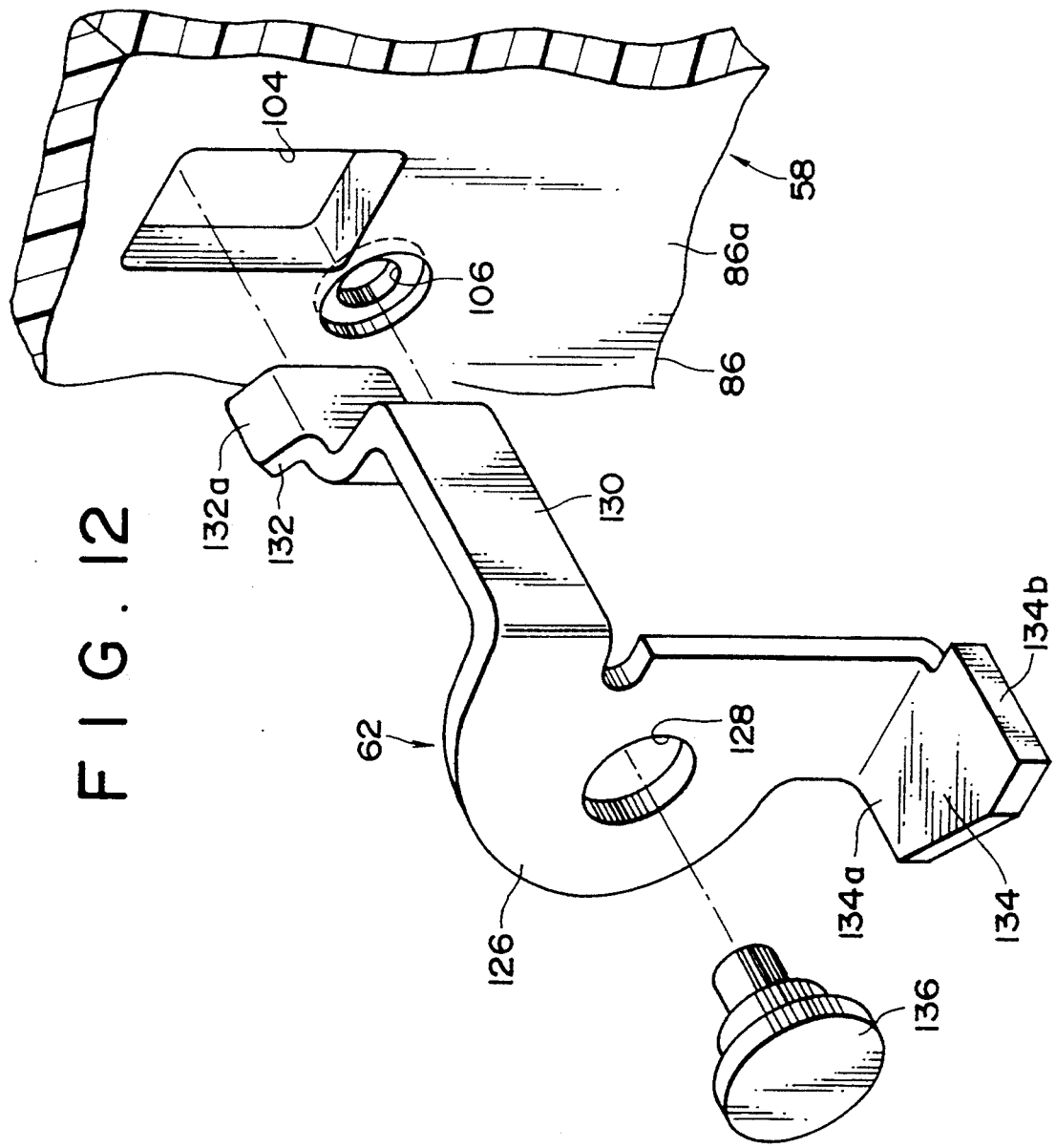
FIG. 12 is an exploded perspective view showing the method of attaching the pressure lever to the latch member.

As shown in FIG. 12, the pressure lever 62, thus constructed, is mounted to the latch member 58 by inserting a support pin 136 through hole 128 into the support hole 106, which is formed on the left side surface 86a of the side plate 86 of the latch member 58. Accordingly, the pressure lever is supported by the latch member 58 about the support pin 136.

When the pressure lever 62 is swingably mounted to the latch member 58, the arm portion 130 of the pressure lever 62 protrudes through the hole 104 of the latch member 58 into the groove 68 of the holder member 54. Thus, the slant portion 132 of the pressure lever 62 is positioned in the large recess 70 of the holder member 54. The front end 134b of the contact plate 134 of the pressure lever 62 contacts the lower end of the movable terminal plate 94 of the detection switch 64 to bend the lower half portion 94b to the right (as shown in FIG. 10B), so that the lower half portion 94b is aligned with the upper half portion 94a as shown in FIG. 6.

In this state as shown in FIG. 6, the lower end of the movable terminal plate 94 is set to be remote from the lower end of the stationary terminal plate 92. The detection switch 64 is therefore in the OFF state. At the same time, the pressure lever 62 is forced in a clockwise direction (as shown in FIG. 6) about the support pin 136 by the resiliency of the bent lower half portion 94b. But the rear edge 134a of the contact plate 134 of the pressure lever 62 contacts the second stepped portion 84b of the bottom plate 84 of the latch member 58 thereby having its rotation in the clockwise direction stopped. Accordingly, the pressure lever 62 is maintained in a position such that the contact plate 134 extends horizontally and the arm portion 130 extends vertically, as shown in FIG. 6.

Hereinafter, the latching and releasing operations of the lid latch device 12 will be described with reference to FIGS. 5 and 6 and FIGS. 13 through 19.

As shown in FIGS. 5 and 6, when the back lid 40 is open, the latch member 58 is urged upward by the urging force of the spring 52, and the detection switch 64 is in the OFF state since the movable terminal plate 94 is separated and isolated from the stationary terminal plate 92.

When the back lid 40 is in this open state, if an unexpected force or shock is applied to the camera 10, the detection switch 64 is never turned ON since the latch member 58 is resiliently held in the upper latch position. Furthermore in the present embodiment, if the open button 50 is accidentally depressed from the upper latch position to the lower release position against the urging force of the spring 52, the OFF state of the detection switch 64 is maintained unless the pressure lever 62 is swung from the upright position to the slanted position. In other words, in the present embodiment, the detection switch is turned ON in accordance with the swing of the pressure lever 62 from the upright position to the slanted position, and not turned ON even though the open button 50 is depressed from the upper latch position to the lower release position.

Accordingly, in the present embodiment, if the erroneous depression of the open button 50 happens, the detection switch 64 is never turned ON while the back lid 40 is opened, and thereby the auto-loading operation of the film is never initiated by the detection circuit.

Figure 13:
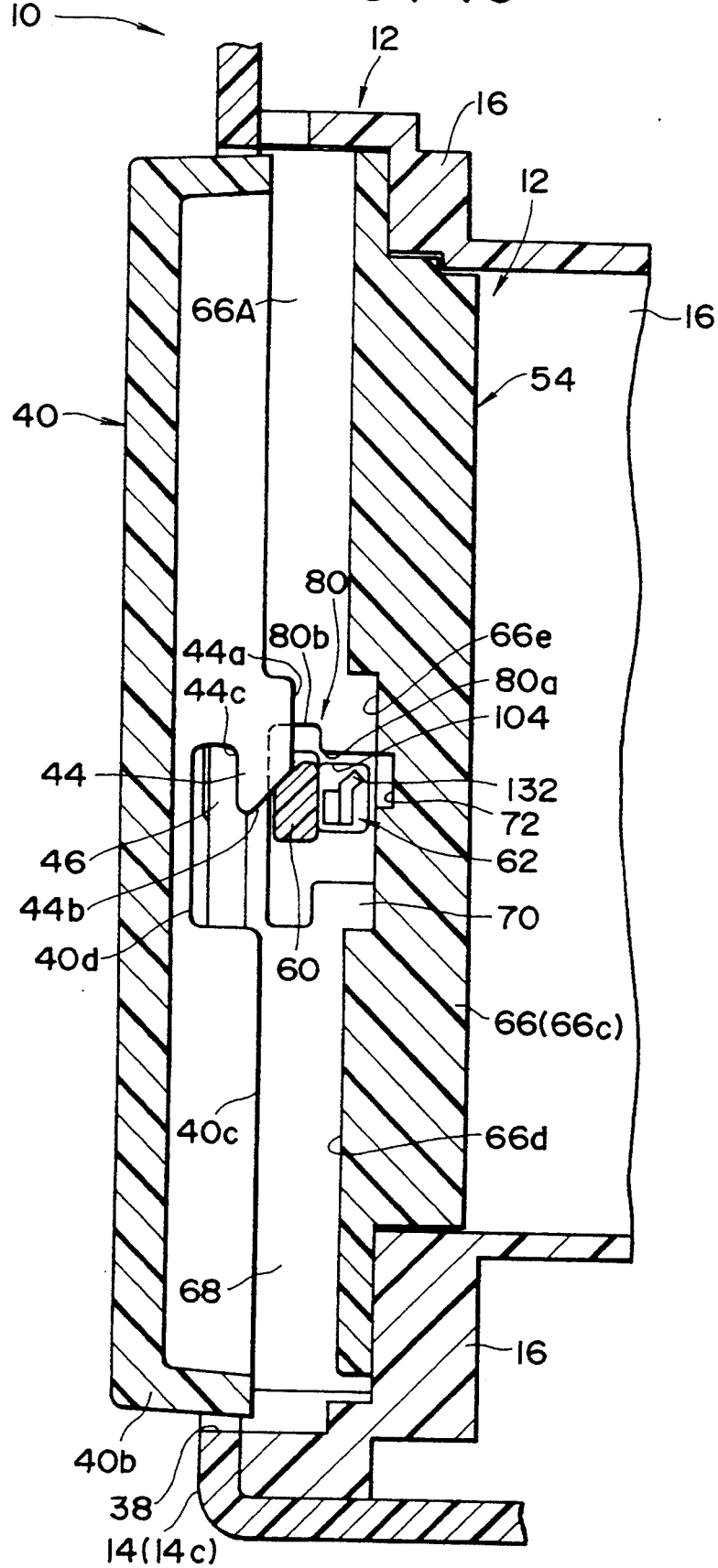
FIG. 13 is a vertical cross-sectional view of the lid latch device corresponding to the B—B cross section of FIG. 4, in a condition where the back lid is closing and the slant engaging surface of the back lid just contacts the slant surface of the hook portion of the lock member.
Figure 14:
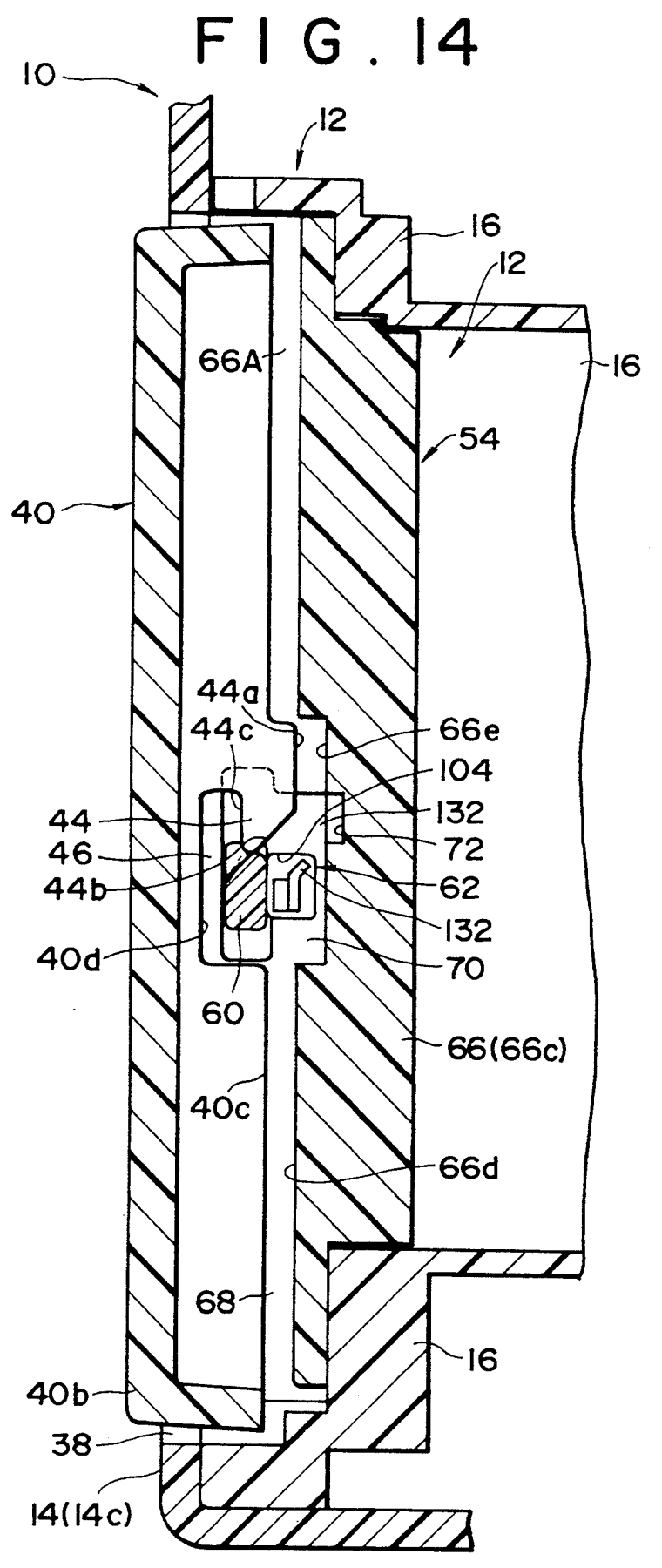

As shown in FIG. 13, when the back lid 40 is swung from the open position to the closed position, the engaging portion 44 of the back lid 40 comes in contact with the hook portion 60 of the latch member 58 on the way to the closed position, as shown in FIG. 13. More specifically, the slant engaging surface 44b of the engaging portion 44 comes in contact with the slant surface 60a of the hook portion 60 as the back lid 40 is being closed. Further closing of the back lid 40 (more than shown in FIG. 13) results in the slant engaging surface 44b forcing the slant surface 60a downward. Thus the hook portion 60 is forcibly lowered toward the lower release position against the urging force of the spring 52, as shown in FIG. 14.

As the back lid 40 is further closed, the lowest point of the slant engaging surface 44b of the engaging portion 44 contacts the highest point of the slant surface 60a of the hook portion 60, and thus, stopping the lowering operation. With further closing of the back lid 40, the lowest point of the slant engaging surface 44b will pass over the highest point of the slant surface 60a. The engaging portion 44 is then inserted in the groove 68 of the holder member 54 with the hook portion 60 entering the lower opening of the groove 46.

Figure 15:
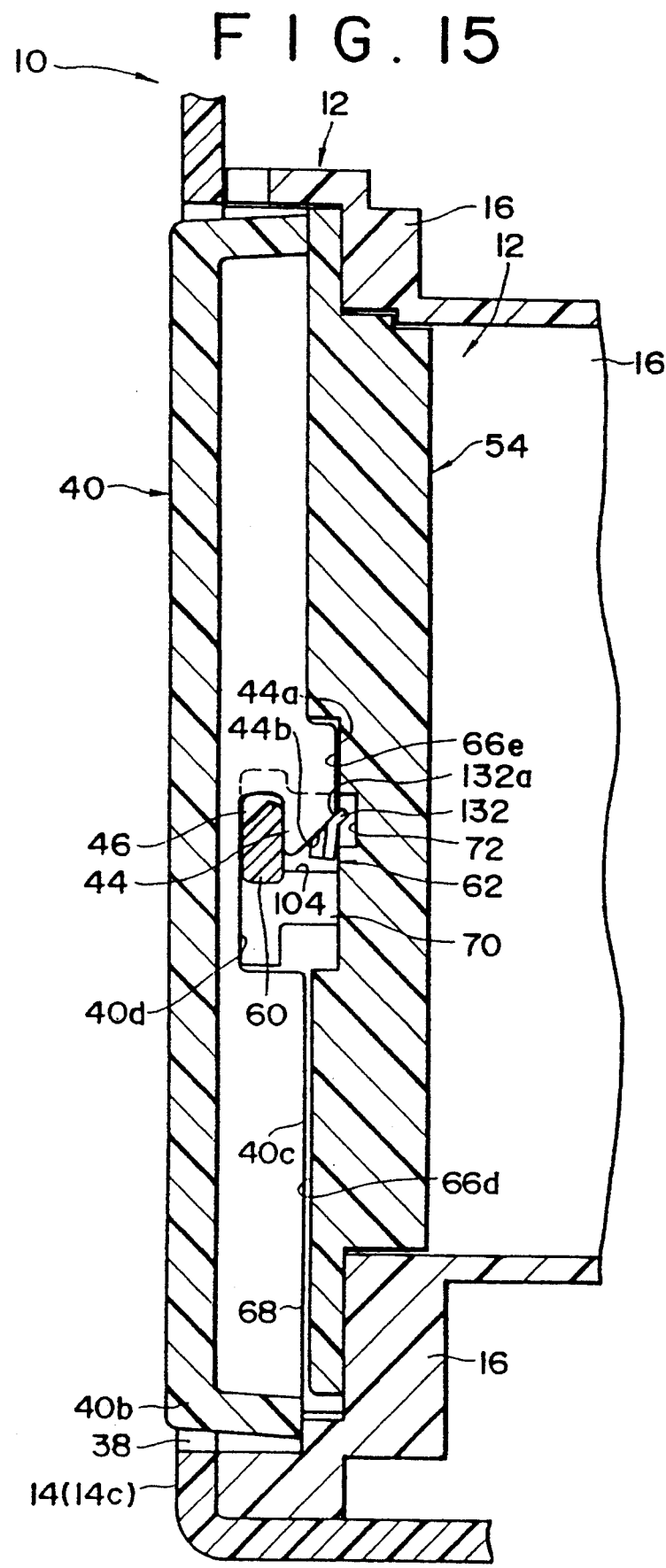
FIG. 15 is a vertical cross-sectional view of the lid latch device corresponding to the B—B cross-section of FIG. 4, in a condition where the back lid is in the closed state and latched by the lid latch device.

Afterwards, the back lid 40 is completely closed, and thus, the recessed portion 38 of the camera housing 14 is covered by the back lid 40. The hook portion 60 is raised up in the groove 46 and the latch member 58 is accordingly raised up by the urging force of the spring 52, as shown in FIG. 15. As a result, the engaging portion 44 of the back lid 40 is firmly engaged by the hook portion 60 of the latch member 58. Thus, the back lid 40 is latched by the lid latch device 12.

Figure 16:
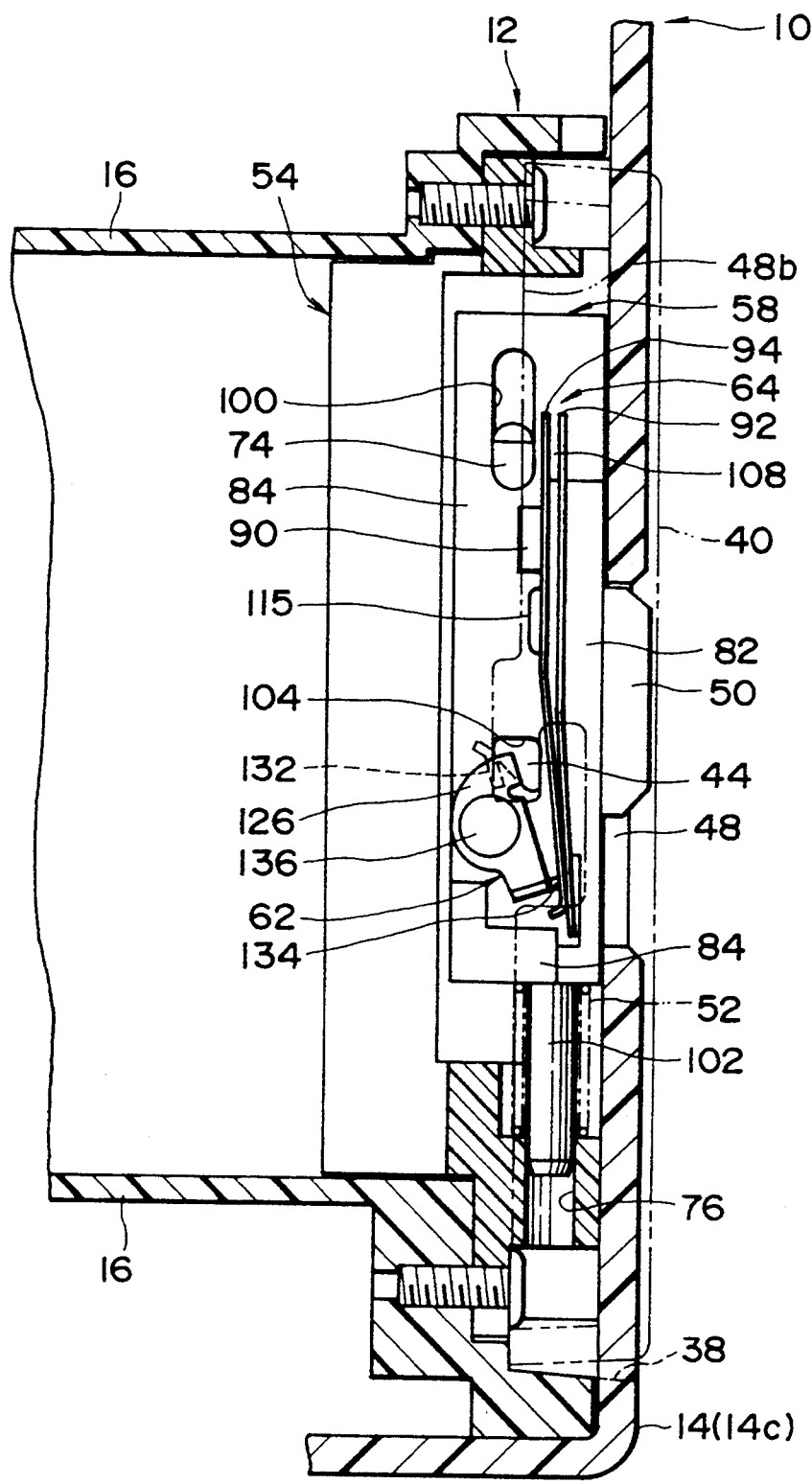
FIG. 16 is a vertical cross-sectional view of the lid latch device corresponding to the C—C cross-section of FIG. 4 in the same condition shown in FIG. 15.

While the hook portion 60 of the latch member 58 is raised up in the groove 46, the pressure lever 62, attached to the latch member 58, is also raised up. In accordance with the ascending operation of the pressure lever 62, the slant portion 132 of the pressure lever 62 comes in contact with the engaging portion 44 engaged by the hook portion 60. Accordingly, the pressure lever 62 is rotated due to the engagement between the slant surface 132a of the slant portion 132 and the slant engaging surface 44b of the engaging portion 44, with the urging force being generated by the movable terminal plate 94. Upon rotation of the pressure lever 62, the front edge 134b of the contact plate 34 of the pressure lever 62 presses the lower end of the movable terminal plate 94 to the right as shown in FIG. 16 against the urging force thereof.

Accordingly, the lower end of the movable terminal plate 94 contacts the lower end of the stationary terminal plate 92 until the ascending operation of the pressure lever 62 is finished. As a result, the detection switch 64 is turned ON by electrical connection made between the movable terminal plate 94 and the stationary terminal plate 92, as shown in FIG. 16, and as a result the detection circuit initiates the auto-loading operation of the film. The ON state of the detection switch 64 is maintained while the back lid 40 remains closed and the open switch 50 is in its resting position.

Figure 17:
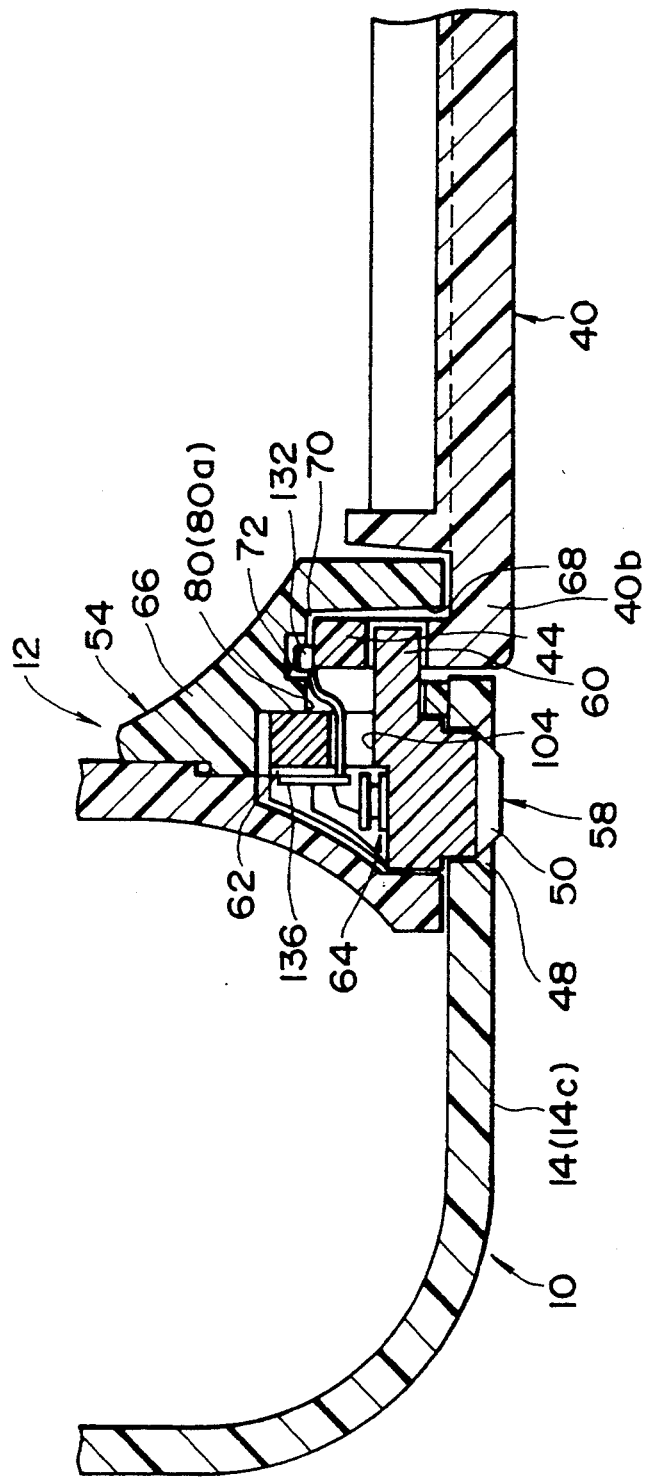
FIG. 17 is a horizontal cross-sectional view of the lid latch device corresponding to the A—A cross-section of FIG. 3, in the same condition shown in FIG.

When the slant portion 132 of the pressure lever 62 is being moved by means of engagement with the engaging portion 44, the slant portion 132 is received in the small recess 72 formed on the bottom surface 66e of the large recess 70. This allows the rotation of the pressure lever 62 to turn the detection switch 64 on as shown in FIGS. 15 and 17.

When the open button 50 is depressed from the upper latch position to the lower release position as shown in FIG. 18, the slant portion 132 of the pressure lever 62 is downwardly disengaged from the engaging portion 44 of the back lid 40. Thus, the pressure lever 62 is rotated in the clockwise direction by the urging force of the bent movable terminal plate 94 of the detection switch 64. As a result, the movable terminal plate 94 is disconnected from the stationary terminal plate 92, and thereby, the detection switch 64 is turned OFF as shown in FIG. 18.

Further, when the open button 50 is depressed from the upper latch position to the lower release position, the hook portion 60 of the latch member 58 is drawn out from the groove 46 as shown in FIG. 19. Therefore the latch between the engaging portion 44 and the hook portion 60 is released. As a result, the back lid 40 is released from the closed position shown in FIG. 19.

As the present invention may be embodied in several forms without departing from the spirit and scope of essential characteristics thereof, the present embodiment is therefore illustrative and not restrictive, since the scope of the present invention is defined by the appending claims rather than by the description preceding them, and all changes that fall within the bounds of the claims, or their equivalence, are therefore intended to be embraced by the claims.

For example, in the present embodiment, the detection switch 64 including the stationary terminal plate 92 and the movable terminal plate 94, is attached to the latch member 58 to which the open button 50 is integrally formed. However, it would be possible that the detection switch 64 is attached to either of the holder member 54 or the main frame 16 if the detection switch 64 can be actuated according to the closing operation of the back lid 40.

Furthermore, in the present embodiment, the detection switch 64 is actuated by the pressure lever 62 which is rotated in accordance with the engagement between the slant portion 132 of the pressure lever 62 and the engaging portion 44 of the back lid 40. However, it would be possible that the detection switch 64 may be directly actuated by the engaging portion 44 of the back lid 40 without using the pressure lever 62.

Still further, in the present embodiment, both of the stationary terminal plate 92 and the movable terminal plate 94 of the detection switch 64 are attached to the latch member 58. However, it would be possible that either one of the stationary terminal plate 92 and the movable terminal plate 94 is attached to the engaging portion 44, and the other terminal plate is attached to the latch member 58, holder member 54 or the main frame 16. In this case, the stationary terminal plate 94 and the movable terminal plate 94 are electrically connected to each other when the back lid 40 is closed.

Also in the present invention, the detection switch 64 is normally OFF where the back lid 40 is opened and turned ON when the back lid 40 is closed. However, it would be possible that the detection switch 64 may be normally ON when the back lid 40 is opened, and turned OFF when the back lid 40 is closed.

Furthermore, in the present embodiment, the engaging portion 44 is formed to the back lid 40 while the lid latch device 12 is provided to the main frame 16. However, it would be possible that the engaging portion 44 may be formed to the main frame 16 or the camera housing 14 while the lid latch device 12 may be provided to the back lid 40.

Still further, in the present embodiment, if the detection circuit detects that the detection switch 64 is turned ON, it initiates the auto-loading operation of the film. However, it would be possible that the detection circuit may initiate another predetermined operation which should be initiated when the back lid is closed.

The present disclosure relates to a subject matter contained in Japanese Utility Model Application No. HEI 4-80682. filed on Oct. 28, 1992, which is expressly incorporated herein by its reference.

What is claimed is:

1. A lid latch device adapted to be used for a back lid openable to a camera, said device comprising:
    latch means for latching said back lid in a closed position;
    release means for releasing said latch means, said back lid being unlatched from said closed position when said latch means is released; and
    switch means for switching an output signal from a first predetermined level to a second predetermined level, said switch means being actuated directly by said back lid only when said back lid is moved to said closed position and latched by said latch means.

2. The lid latch device according to claim 1, wherein said back lid includes an engaging portion,
    said latch means includes a latch member movable between a latched position and a released position, said latch member also having a hook portion for engaging said engaging portion, and
    said switch means is directly switched by said engaging portion.

3. The lid latch device according to claim 2, wherein said release means includes an open button which is operated manually and which is formed on said latch member.

4. The lid latch device according to claim 3, wherein said engaging portion and said hook portion are disengaged when said open button is moved from a resting position to an operating position.

5. The lid latch device according to claim 2, wherein said latch means further includes urging means for forcing said latch member from said released position to said latched position.

6. The lid latch device according to claim 5, wherein said release means includes an open button which is formed on said latch member and is manually movable from a resting position to an operating position against the force of said urging means.

7. The lid latch device according to claim 1, wherein said camera includes an auto-loading mechanism, said auto-loading mechanism being initiated when a level of said signal output by said switch means is said second predetermined level.

8. The lid latch device according to claim 2, wherein said switch means is provided on said latch member.

9. The lid latch device according to claim 2, wherein said switch means includes a stationary terminal plate attached to said latch member and a movable terminal plate arranged to be electrically insulated from said stationary terminal plate, and said movable terminal plate is deformable so as to electrically contact said stationary terminal plate when said back lid is closed.

10. The lid latch device according to claim 9, which further comprises:

a pressure lever arranged between said movable terminal plate and said engaging portion of said back lid when said back lid is in the closed position, said pressure lever pressing said movable terminal plate such that said movable terminal plate deforms and electrically contacts said stationary terminal plate.

11. A lid latch device adapted to be used for a back lid openable to a camera, said device comprising:

latch means for latching said back lid in a closed position;

release means for releasing said latch means, said latch means being released when said release means is moved from a resting position to an operating position, said back lid being unlatched by said release of said latch means;

an engaging portion which is formed on one of said back lid and said latch means; and switch means provided on the other of said back lid and said latch means, for switching a level of an output signal from a first predetermined level to a second predetermined level, said switch means being actuated directly by said back lid only when said back lid is moved to said closed position and latched by said latch means.

12. The lid latch device according to claim 11, wherein said engaging portion is formed on said back lid, and said latch means, said release means and said switch means are provided on said camera.

13. The lid latch device according to claim 12, wherein said latch means includes a latch member movable between a latched position and a released position, said latch member having a hook portion for engaging said engaging portion, and said switch means is directly switched by said engaging portion.

14. The lid latch device according to claim 13, wherein said release means includes an open button which is operated manually and is formed on said latch member, said open button moving between said resting position and said operating position.

15. The lid latch device according to claim 14, wherein said engaging portion and said hook portion are disengaged when said open button is moved from said resting position to said operating position.

16. The lid latch device according to claim 13, wherein said latch means further includes urging means for forcing said latch member from said released position to said latched position.

17. The lid latch device according to claim 16, wherein said release means includes an open button which is formed on said latch member and is manually movable from said resting position to said operating position against the force of said urging means.

18. The lid latch device according to claim 11, wherein said camera includes an auto-loading mechanism, said auto-loading mechanism being initiated when a level of said signal output by said switch means is said second predetermined level.

19. The lid latch device according to claim 13, wherein said switch means is provided on said latch member.

20. The lid latch device according to claim 13, wherein said switch means includes a stationary terminal plate attached to said latch member and a movable terminal plate arranged to be electrically insulated from said stationary terminal plate, and said movable terminal plate is deformable so as to electrically contact said stationary terminal plate when said back lid is closed.

21. The lid latch device according to claim 20, which further comprises:

a pressure lever arranged between said movable terminal plate and said engaging portion of said back lid is in said closed position, said pressure lever pressing said movable terminal plate such that said movable terminal plate deforms and electrically contacts said stationary terminal plate.

22. A lid latch device adapted to be used for a back lid openable to a camera, said device comprising:

latch means for latching said back lid in a closed position;

release means for releasing said latch means upon movement of said release means from a resting position to an operating position;

urging means for forcing said release means in the direction of said resting position, during said movement of said release means from said resting position to said operating position; and switch means for switching a level of an output signal from a first predetermined level to a second predetermined level, said switch means being actuated directly by said back lid only when said back lid is moved to said closed position and latched by said latch means.

23. The lid latch device according to claim 22, wherein said back lid includes an engaging portion, said latch means includes a latch member movable between a latched position and a released position, said latch member having a hook portion which engages said engaging portion, and said switch means is switched by said engaging portion.

24. The lid latch device according to claim 23, wherein said release means includes an open button which is operated manually and which is formed on said latch member.

25. The lid latch device according to claim 24, wherein said engaging portion and said hook portion are disengaged when said open button is moved from said resting position to said operating position.

26. The lid latch device according to claim 22, wherein
said camera includes an auto-loading mechanism, said auto-loading mechanism being initiated when a level of said signal output by said switch means is said second predetermined level.

27. The lid latch device according to claim 23, wherein
said switch means is provided on said latch member.

28. The lid latch device according to claim 23, wherein
said switch means includes a stationary terminal plate attached to said latch member and a movable terminal plate arranged to be electrically insulated from said stationary terminal plate, and
said movable terminal plate is deformable so as to electrically contact said stationary terminal plate when said back lid is closed.

29. The lid latch device according to claim 28, which further comprises:
a pressure lever arranged between said movable terminal plate and said engaging portion of said back lid when said back lid is in said closed position, said pressure lever pressing said movable terminal plate such that said movable terminal plate deforms and electrically contacts said stationary terminal plate.

30. A detection mechanism for detecting a closing of a back lid of a camera, said camera including latch means for latching said back lid in a closed position; and release means for releasing said latch means, said back lid being unlatched from said closed position when said latch means is released, said mechanism comprising:
an engaging portion provided to said back lid, said latch means including a hook portion for engaging said engaging portion thereby latching said back lid in the closed position; and
switch means for switching an output signal from a first predetermined level to a second predetermined level, said switch means being actuated directly by said engaging member of the back lid only when said back lid is moved to said closed position and latched by said latch means.

31. The detection mechanism according to claim 30, wherein
said latch means includes a latch member movable between a latched position and a released position, said hook portion is provided to said latch member.

32. The detection mechanism according to claim 31, wherein
said release means includes an open button which is operated manually and which is formed on said latch member.

33. The detection mechanism according to claim 32, wherein
said engaging portion and said hook portion are disengaged when said open button is moved from a resting position to an operating position.

34. The detection mechanism according to claim 31, wherein
said latch means further includes urging means for forcing said latch member from said released position to said latched position.

35. The detection mechanism according to claim 34, wherein
said release means includes an open button which is formed on said latch member and is manually movable from a resting position to an operating position against the force of said urging means.

36. The detection mechanism according to claim 30, wherein
said camera includes an auto-loading mechanism, said auto-loading mechanism being initiated when a level of said signal output by said switch means is said second predetermined level.

37. The detection mechanism according to claim 31, wherein
said switch means is provided on said latch member.

38. The detection mechanism according to claim 31, wherein
said switch means includes a stationary terminal plate attached to said latch member and a movable terminal plate arranged to be electrically insulated from said stationary terminal plate, and
said movable terminal plate is deformable so as to electrically contact said stationary terminal plate when said back lid is closed.

39. The detection mechanism according to claim 38, which further comprises:
a pressure lever arranged between said movable terminal plate and said engaging portion of said back lid when said back lid is in said closed position, said pressure lever pressing said movable terminal plate such that said movable terminal plate deforms and electrically contacts said stationary terminal plate.

* * * * *